(12) United States Patent
Matsumura et al.

(10) Patent No.: US 11,671,968 B2
(45) Date of Patent: Jun. 6, 2023

(54) USER TERMINAL AND RADIO COMMUNICATION METHOD

(71) Applicant: NTT DOCOMO, INC., Tokyo (JP)

(72) Inventors: Yuki Matsumura, Tokyo (JP); Kazuki Takeda, Tokyo (JP); Satoshi Nagata, Tokyo (JP); Lihui Wang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/479,061

(22) PCT Filed: Jan. 19, 2018

(86) PCT No.: PCT/JP2018/001507
§ 371 (c)(1),
(2) Date: Jul. 18, 2019

(87) PCT Pub. No.: WO2018/135606
PCT Pub. Date: Jul. 26, 2018

(65) Prior Publication Data
US 2020/0015223 A1 Jan. 9, 2020

(30) Foreign Application Priority Data
Jan. 20, 2017 (JP) .............................. JP2017-008947

(51) Int. Cl.
*H04L 5/00* (2006.01)
*H04W 80/08* (2009.01)
(Continued)

(52) U.S. Cl.
CPC ........... *H04W 72/21* (2023.01); *H04L 5/0051* (2013.01); *H04W 72/0453* (2013.01); *H04W 80/08* (2013.01)

(58) Field of Classification Search
None
See application file for complete search history.

(56) References Cited

U.S. PATENT DOCUMENTS

| | | | |
|---|---|---|---|
| 2013/0100919 A1* | 4/2013 | Han | H04W 99/00 370/329 |
| 2018/0132264 A1* | 5/2018 | Jung | H04L 1/1812 |

(Continued)

OTHER PUBLICATIONS

International Search Report issued in PCT/JP2018/001507 dated Apr. 3, 2018 (2 pages).

(Continued)

*Primary Examiner* — Hong Shao
(74) *Attorney, Agent, or Firm* — Osha Bergman Watanabe & Burton LLP

(57) ABSTRACT

The present invention is designed to transmit UCI adequately even when the formats of multiple UL control channels having different durations are made simple and/or common. A user terminal, according to the present invention, has a transmission section that transmits uplink control information (UCI) by using an uplink (UL) control channel, which has a first duration, or a UL control channel, which contains a plurality of units each constituted by the UL control channel of the first duration, and which has a second duration, and a control section that controls arrangement of a reference signal which is at least time-division-multiplexed with the UCI, and the ratio of the number of symbols in which the reference signal is arranged, to the number of all the symbols in the first duration, is 1/2 or less.

5 Claims, 22 Drawing Sheets

(51) Int. Cl.
*H04W 72/04* (2023.01)
*H04W 72/21* (2023.01)
*H04W 72/0453* (2023.01)

(56) References Cited

U.S. PATENT DOCUMENTS

2018/0213548 A1* 7/2018 Li .................. H04W 72/1242
2018/0270011 A1* 9/2018 Yang ................ H04L 1/0028
2019/0007175 A1* 1/2019 Kwak ............... H04L 5/0048

OTHER PUBLICATIONS

Written Opinion of the International Searching Authority issued in PCT/JP2018/001507 dated Apr. 3, 2018 (4 pages).
Ericsson; "Physical design aspects of sPUCCH"; 3GPP TSG-RAN WG1 #85, R1-165297; Nanjing, P.R. China; May 23-27, 2016 (4 pages).
Samsung; "UL Control Channel Design: Long Format"; 3GPP TSG RAN WG1 NR Ad-Hoc Meeting, R1-1700951; Spokane, USA; Jan. 16-20, 2017 (4 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
Office Action issued in Japanese Application No. 2018-562440 dated Feb. 8, 2022 (11 pages).
NTT Docomo, Inc., "UL control channel structure in long duration", 3GPP TSG RAN WG1 AH_NR Meeting, R1-1700623, Spokane, USA, Jan. 16-20, 2017 (6 pages).

* cited by examiner

FIG. 6A
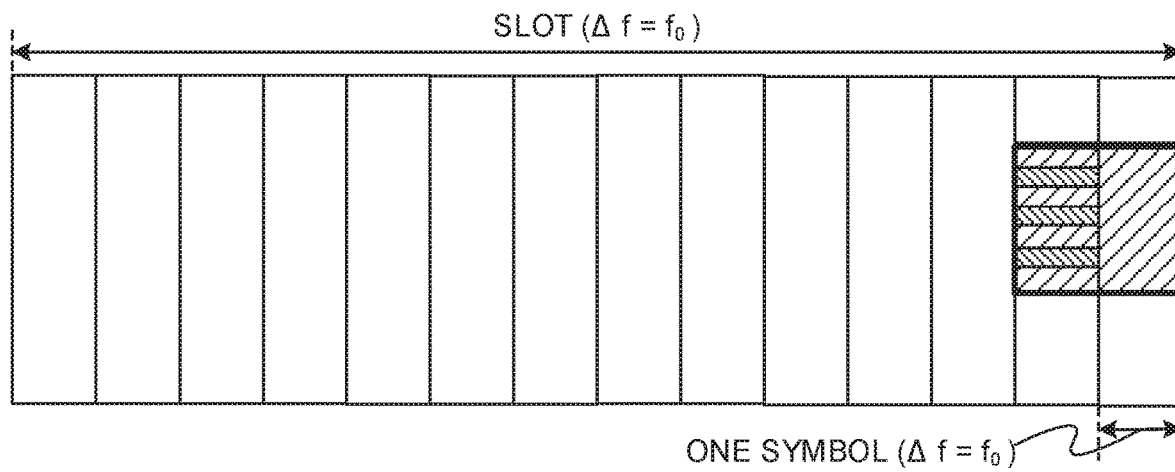
FIG. 6B
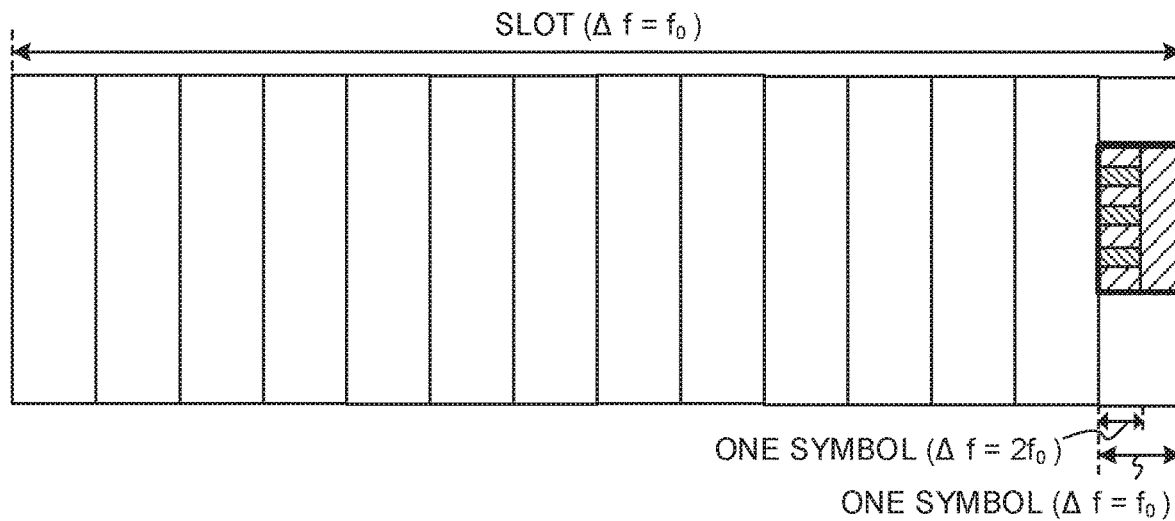
 UCI   RS   PUCCH UNIT FIG. 12A
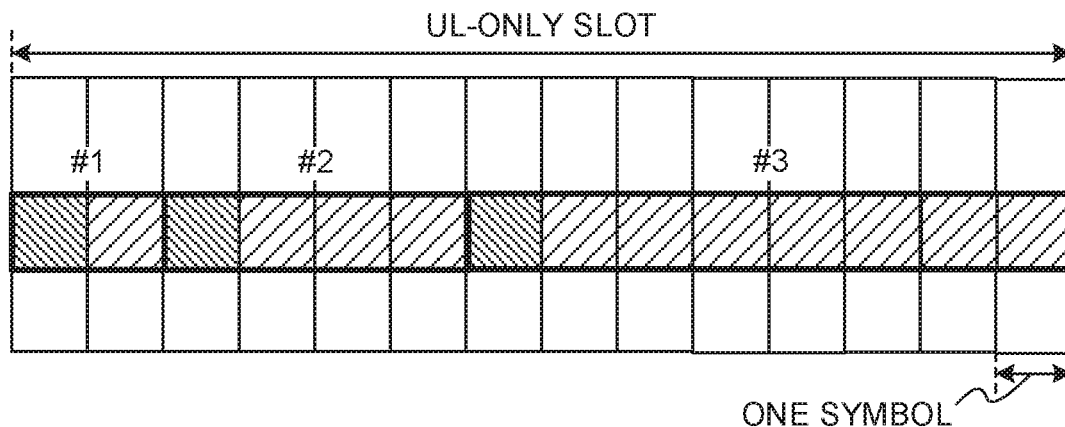
FIG. 12B
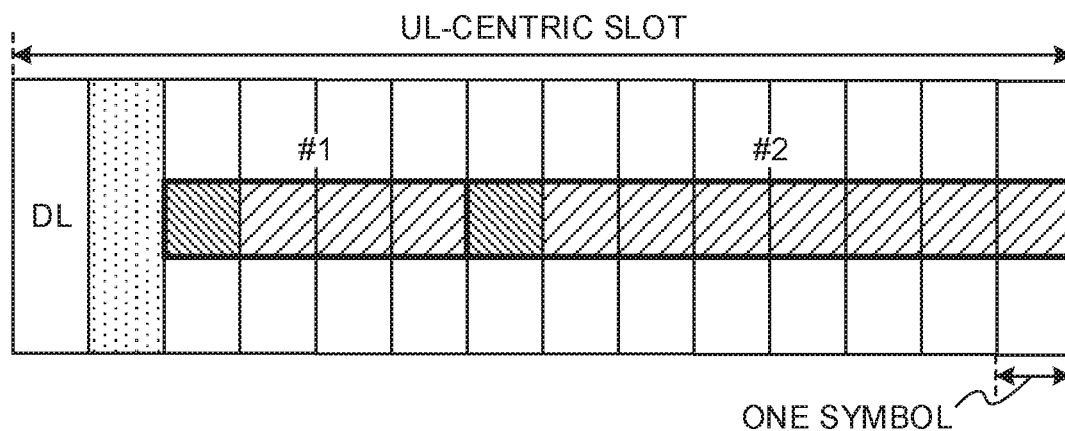
|  UCI |  RS |
|---|---|
|  PUCCH UNIT |  GAP PERIOD |

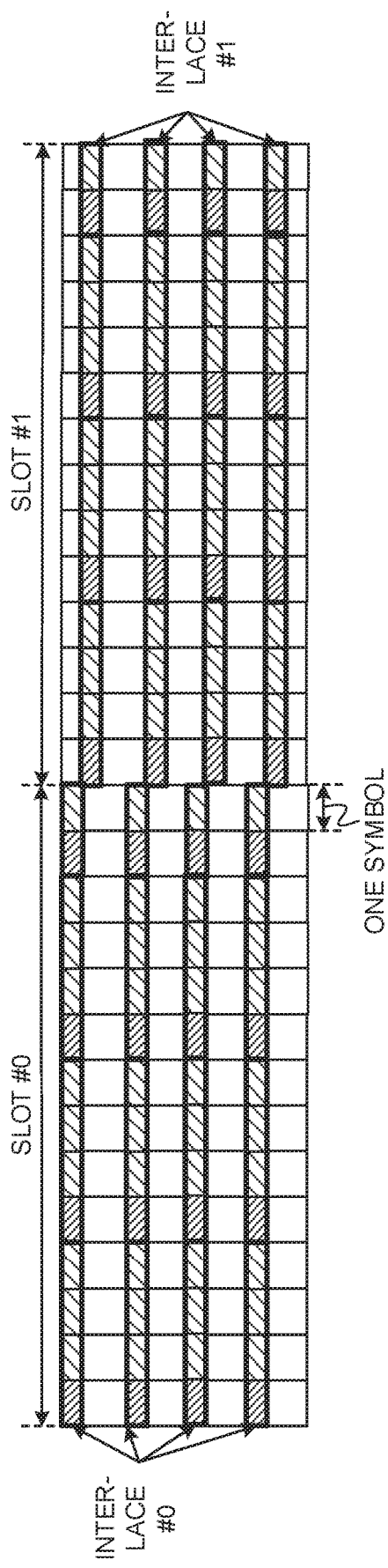
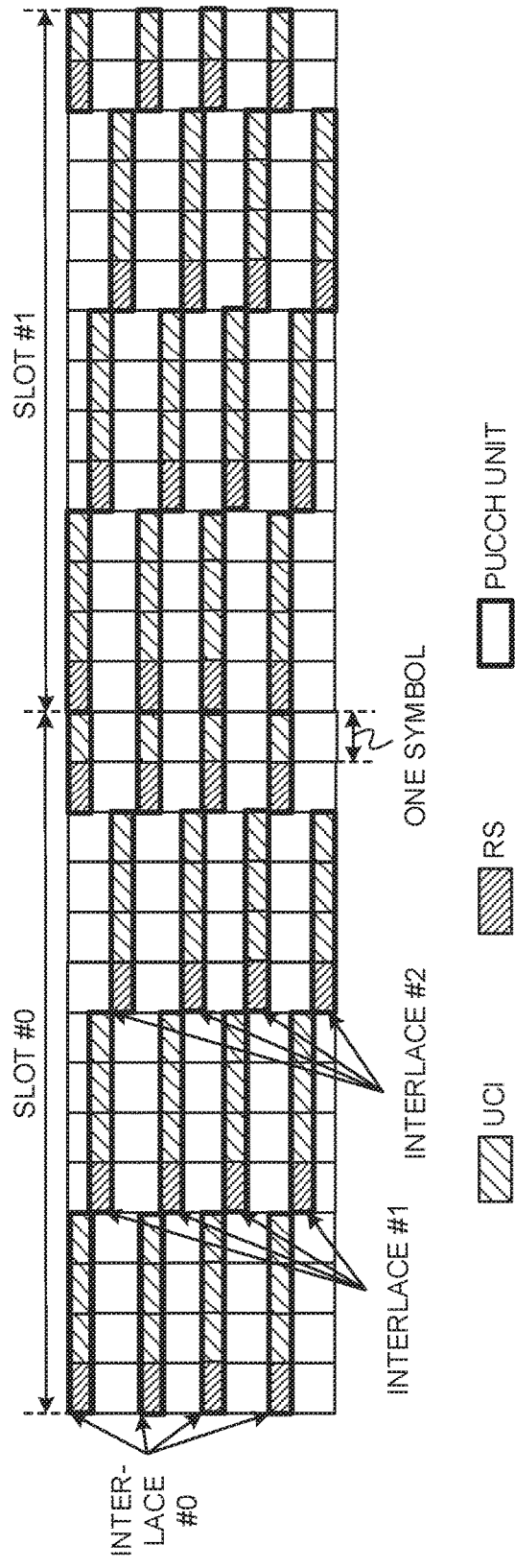

USER TERMINAL AND RADIO COMMUNICATION METHOD

TECHNICAL FIELD

The present invention relates to a user terminal and a radio communication method in next-generation mobile communication systems.

BACKGROUND ART

In the UMTS (Universal Mobile Telecommunications System) network, the specifications of long-term evolution (LTE) have been drafted for the purpose of further increasing high speed data rates, providing lower latency and so on (see non-patent literature 1). In addition, successor systems of LTE are also under study for the purpose of achieving further broadbandization and increased speed beyond LTE (referred to as, for example, "LTE-A (LTE-Advanced)," "FRA (Future Radio Access)," "4G," "5G," "5G+ (plus)," "NR (New RAT)," "LTE Rel. 14," "LTE Rel. 15 (or later versions)," and so on).

In existing LTE systems (for example, LTE Rel. 8 to 13), downlink (DL) and/or uplink (UL) communication are performed using one-ms subframes (also referred to as "transmission time intervals (TTIs)" and so on). These subframes are the time unit for transmitting one channel-encoded data packet, and serve as the unit of processing in, for example, scheduling, link adaptation, retransmission control (HARQ: Hybrid Automatic Repeat reQuest) and so on.

Also, in existing LTE systems (for example, LTE Rel. 8 to 13), a user terminal transmits uplink control information (UCI) by using a UL control channel (for example, PUCCH: Physical Uplink Control Channel) or a UL data channel (for example, PUSCH: Physical Uplink Shared Channel). The format of this UL control channel is referred to as "PUCCH format" and so on.

CITATION LIST

Non-Patent Literature

Non-Patent Literature 1: 3GPP TS36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

For future radio communication systems (for example, LTE Rel. 14, LTE Rel. 15 or later versions, 5G, NR and so on), a study is in progress to support a UL control channel (hereinafter also referred to as a "short PUCCH") of a shorter duration than existing PUCCH formats (for example, PUCCH formats 1 to 5 of and before LTE Rel. 13). Furthermore, a study is in progress to support a UL control channel having a longer duration than this short PUCCH (hereinafter also referred to as a "long PUCCH").

In this way, since it is likely that future radio communication systems will support a plurality of UL control channels of varying durations (for example, a short PUCCH and/or a long PUCCH), it is desirable to make the formats of these multiple UL control channels simple and/or common. For example, future radio communication systems are being studied to make the formats of the long PUCCH and the short PUCCH simple and/or common by arranging the long PUCCH and a plurality of short PUCCHs side by side in the time direction.

However, when the formats of multiple UL control channels having different durations are made simple and/or common, the number of symbols in which reference signals (for example, DMRSs (DeModulation Reference Signals) are arranged increases, and, as a result of this, UCI may not be transmitted properly.

The present invention has been made in view of the above, and it is therefore an object of the present invention to provide a user terminal and a radio communication method, whereby UCI can be transmitted properly even when the formats of multiple UL control channels having different durations are made simple and/or common.

Solution to Problem

A user terminal according to one aspect of the present invention has a transmission section that transmits uplink control information (UCI) by using an uplink (UL) control channel, which has a first duration, or a UL control channel, which contains a plurality of units each constituted by the UL control channel of the first duration, and which has a second duration, and a control section that controls arrangement of a reference signal which is at least time-division-multiplexed with the UCI, and, in this user terminal, the ratio of the number of symbols in which the reference signal is arranged, to the number of all the symbols in the first duration, is 1/2 or less.

Advantageous Effects of Invention

According to the present invention, a user terminal can appropriately transmit UCI even when the formats of multiple UL control channels having different durations are made simple and/or common.

BRIEF DESCRIPTION OF DRAWINGS

FIG. 6A and FIG. 6B are diagrams, each showing a third example of the format of a short PUCCH according to the first aspect;

FIG. 12A and FIG. 12B are diagrams, each showing a third example of the format of a long PUCCH in the time direction according to the second aspect;

FIG. 15A and FIG. 15B are diagrams, each showing an example of interlaced transmission according to a third aspect of the present invention;

DESCRIPTION OF EMBODIMENTS

Future radio communication systems (for example, LTE Rel. 14, 15 and/or later versions, 5G, NR, etc.) are under study for introducing multiple numerologies (including, for example, subcarrier spacing and/or symbol duration), not a single numerology.

Also, future radio communication systems are being studied to introduce time units (also referred to as "subframes," "slots," "minislots," "subslots," "transmission time intervals (TTIs)," "short TTIs," "radio frames" and so on) that are the same and/or different than existing LTE systems (LTE Rel. 13 or earlier versions), while supporting multiple numerologies and so on.

Subframes may serve as a time unit having a predetermined time duration (for example, 1 ms), irrespective of which numerology is used by the user terminal (for example, UE (User Equipment)).

On the other hand, slots may serve as a time unit that is based on the numerology used by the user terminal. For example, if the subcarrier spacing is 15 kHz or 30 kHz, the number of symbols per slot may be seven or fourteen. Meanwhile, when the subcarrier spacing is 60 kHz or greater, the number of symbols per slot may be fourteen. In addition, a slot may include a plurality of minislots (subslots).

Generally, subcarrier spacing and symbol duration hold a reciprocal relationship. Therefore, as long as the number of symbols per slot (or minislot (subslot)) stays the same, the higher (wider) the subcarrier spacing, the shorter the slot length, and the lower (narrower) the subcarrier spacing, the longer the slot length. Note that "subcarrier spacing is high" may be paraphrased as "subcarrier spacing is wide," and "subcarrier spacing is low" may be paraphrased as "subcarrier spacing is narrow."

For such future radio communication systems, a study is in progress to support a UL control channel (hereinafter also referred to as a "short PUCCH") that is structured to be shorter in duration than the PUCCH formats of existing LTE systems (for example, LTE Rel. 13 and/or earlier versions) and/or a UL control channel (hereinafter also referred to as a "long PUCCH") that is structured to have a longer duration than the above short duration.

Figure 1A:
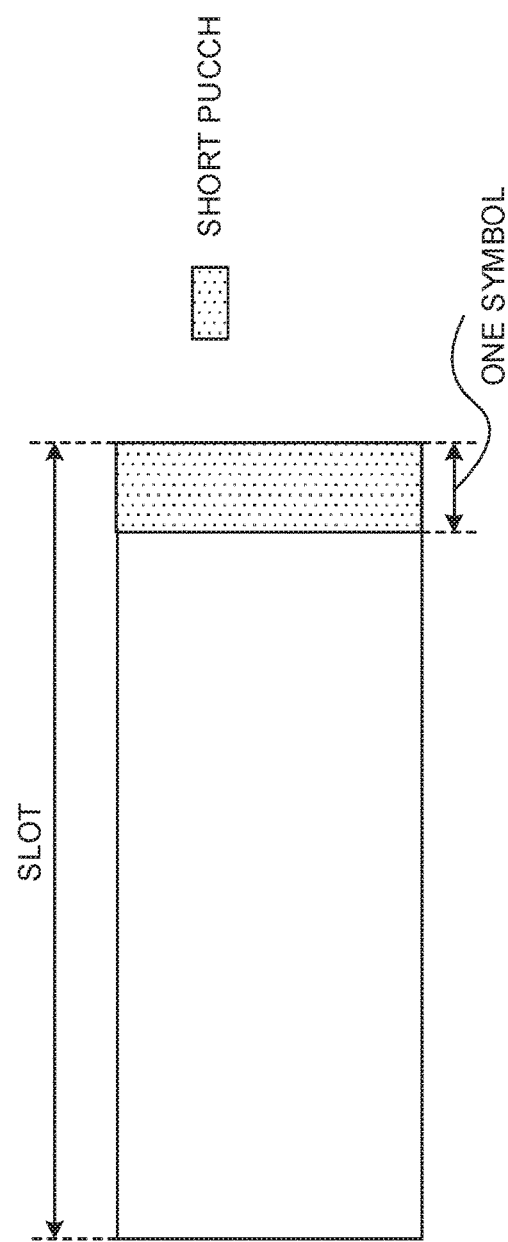
FIG. 1A and FIG. 1B are diagrams, each showing an example of a UL control channel.
Figure 1B:
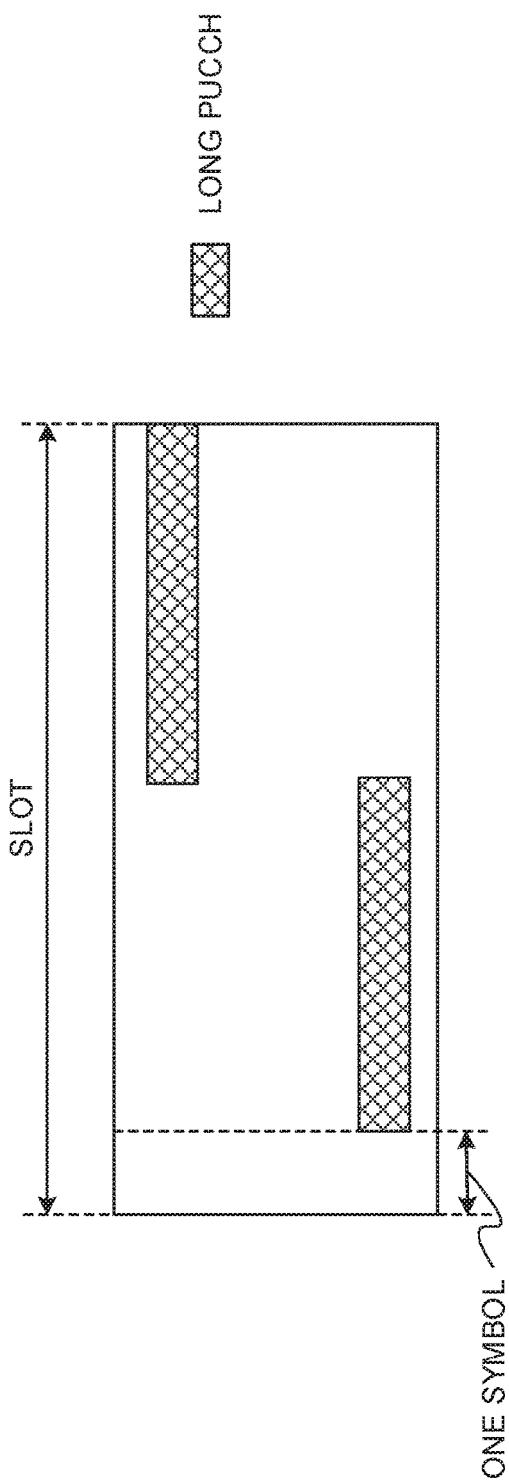

FIG. 1 provide diagrams, each showing an example of a UL control channel in a future radio communication system. FIG. 1A shows an example of a short PUCCH, and FIG. 1B shows an example of a long PUCCH. As shown in FIG. 1A, a short PUCCH is arranged in a predetermined number of symbols (here, one symbol) from the end of the slot. Note that the symbol to arrange the short PUCCH is not confined to the end of a slot, and a predetermined number of symbols at the top or in the middle of a slot may be used as well. In addition, the short PUCCH is placed in one or more frequency resources (for example, one or more physical resource blocks (PRBs)).

Also, the short PUCCH may be time-division-multiplexed and/or frequency-division-multiplexed with the UL data channel (hereinafter also referred to as "PUSCH") within a slot. Also, within a slot, the short PUCCH may be time-division-multiplexed and/or frequency-division-multiplexed with the DL data channel (hereinafter also referred to as the "PDSCH") and/or the DL control channel (hereinafter also referred to as the "PDCCH (Physical Downlink Control Channel)").

With the short PUCCH, a multi-carrier waveform (for example, the OFDM (Orthogonal Frequency Division Multiplexing) waveform) may be used, or a single-carrier waveform (for example, the DFT-s-OFDM (Discrete Fourier Transform-Spread-Orthogonal Frequency Division Multiplexing) waveform) may be used.

Meanwhile, as shown in FIG. 1B, the long PUCCH is arranged over a plurality of symbols in the slot so as to improve the coverage over the short PUCCH. Referring to FIG. 1B, this long PUCCH is not arranged in a predetermined number of symbols (here, one symbol) at the top of the slot, but can be arranged in a predetermined number of symbols at the top. Also, the long PUCCH may be comprised of a number of frequency resources to match the short PUCCH, or the long PUCCH may be formed with a smaller number of frequency resources (for example, one or two PRBs) than the short PUCCH, in order to achieve a power boosting effect.

Also, the long PUCCH may be frequency-division-multiplexed with the PUSCH within a slot. In addition, the long PUCCH may be time-division-multiplexed with the PDCCH within a slot. Also, the long PUCCH may be placed with the short PUCCH in the same slot. For the long PUCCH, a single-carrier waveform (for example, DFT-s-OFDM waveform) may be used, or a multicarrier waveform (for example, OFDM waveform) may be used.

Furthermore, as shown in FIG. 1B, to the long PUCCH, frequency hopping may be applied per predetermined duration within a slot (for example, per mini (sub) slot). This frequency hopping may be applied at the timing the number of transmission symbols becomes equal before and after the frequency hopping (for example, seven symbols if there are fourteen symbols per slot), or may be applied at a timing the number of symbols becomes uneven before and after the frequency hopping (for example, if there are fourteen symbols per slot, the timing the first half contains six symbols and the second half contains eight symbols).

Thus, future radio communication systems are assumed to support a plurality of UL control channels of different durations (for example, a short PUCCH and/or a long PUCCH), so that it is desirable to make the formats of these multiple UL control channels simple and/or common. For example, for future radio communication systems, a study is in progress to use a short PUCCH as one unit and construct a long PUCCH with a plurality of units. Here, the "unit" is the minimum unit to constitute a UL control channel, and may also be referred to as the "PUCCH unit" and so on.

FIG. 2 provide diagrams, each showing an example of the format of a short PUCCH. In the following drawings, slots that are comprised of fourteen symbols with subcarrier spacing ($\Delta f$) $f_0$ will be shown as examples. Here, $f_0$ is, for example, 15 kHz, but this is by no means limiting. Also, the number of symbols in a slot is not limited to fourteen either.

Figure 2A:
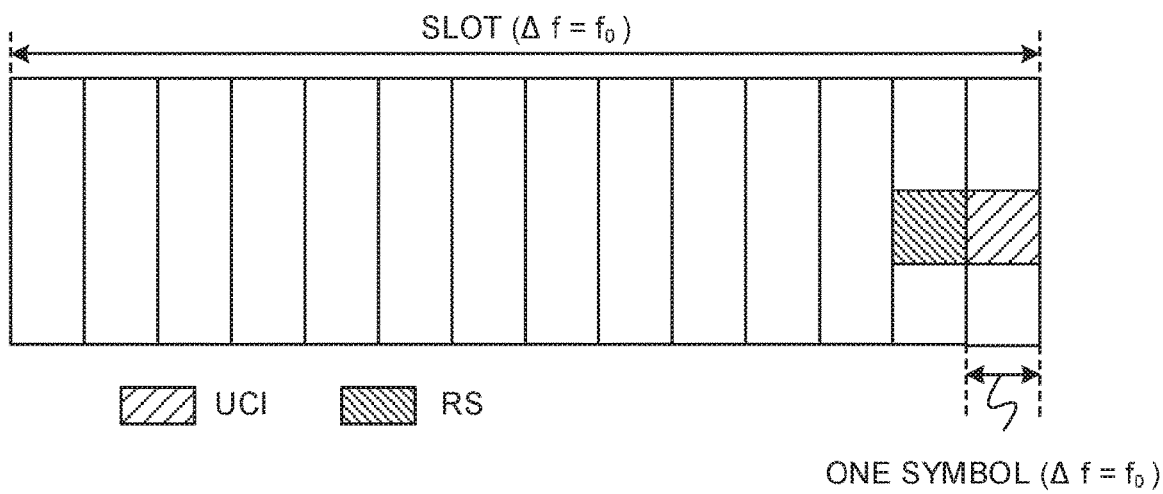
FIG. 2A and FIG. 2B are diagrams, each showing an example of a format of a short PUCCH.

In FIG. 2A, the short PUCCH is comprised of a plurality of symbols (for example, two symbols) with subcarrier spacing $f_0$, and UCI and a reference signal (RS) are time-division-multiplexed. The RS may be, for example, the demodulation reference signal (DMRS: DeModulation Reference Signal), which is used to demodulate UCI. A multi-carrier waveform (for example, the OFDM waveform) or a single-carrier waveform (for example, the DFT-s-OFDM waveform) can be applied to this short PUCCH.

Figure 2B:
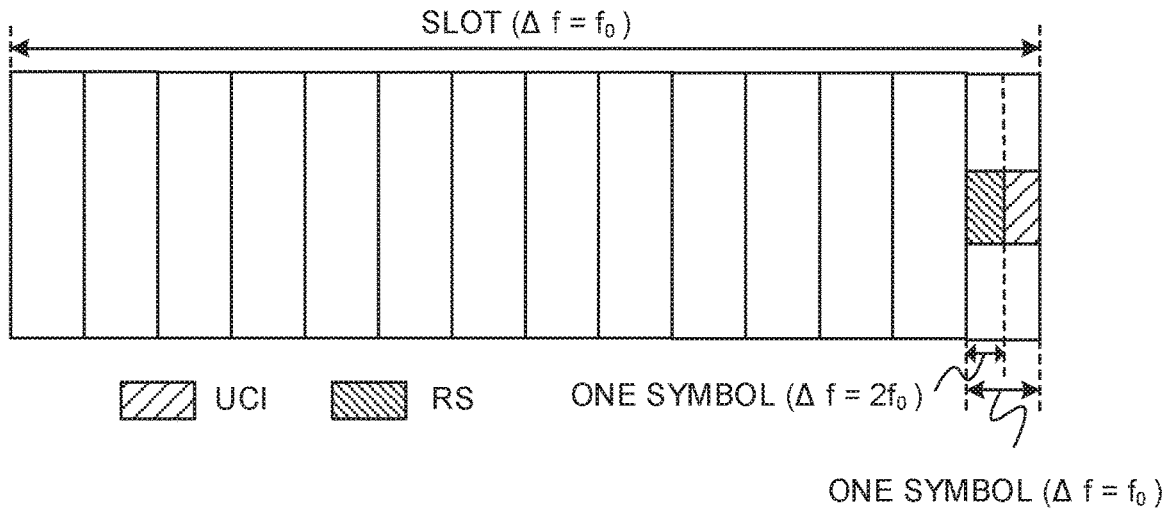

Also, referring to FIG. 2B, in one symbol of subcarrier spacing $f_0$, the short PUCCH is formed with a plurality of symbols (for example, two symbols) having a subcarrier spacing of $2f_0$, which is higher than subcarrier spacing $f_0$ (for example, in the event $f_0$=15 kHz, $2f_0$=30 kHz), and UCI and an RS are time-division-multiplexed. In this manner, within one symbol in which the base subcarrier spacing is $f_0$, a plurality of symbols with higher subcarrier spacing may be referred to as "split symbols," for example.

Thus, in the short PUCCH, the number of symbols within a certain period can be controlled by adjusting the subcarrier spacing. Consequently, as shown in FIG. 2B, even when only a period to match one symbol with base subcarrier spacing $f_0$ is provided in the short PUCCH, it is still possible to time-division-multiplex UCI and an RS by using higher subcarrier spacing. Therefore, a single-carrier waveform (for example, the DFT-s-OFDM waveform) can be applied to this short PUCCH. Of course, a multi-carrier waveform (for example, the OFDM waveform) can be applied to the short PUCCH as well.

Figure 3A:
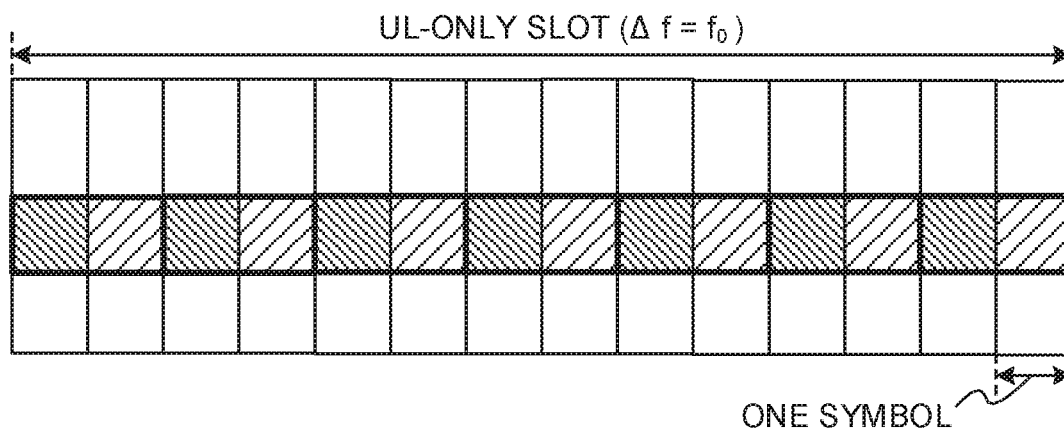
FIG. 3A and FIG. 3B are diagrams, each showing an example of a format of a long PUCCH.

FIG. 3 provide diagrams, each showing an example of the format of a long PUCCH. FIG. 3A shows an example of a slot (UL-only slot) for transmitting and receiving UL signals (for example, the PUSCH and/or the PUCCH).

In the UL-only slot shown in FIG. 3A, the long PUCCH is arranged over all of the fourteen symbols. This long PUCCH is formed by arranging seven PUCCH units, which are constituted by short PUCCHs, along the time direction. With the short PUCCHs shown in FIG. 3A, UCI is mapped over seven symbols in different PUCCH units, using at least one of spreading, repetition and coding. The radio base station synthesizes the UCI mapped to these seven symbols.

Figure 3B:
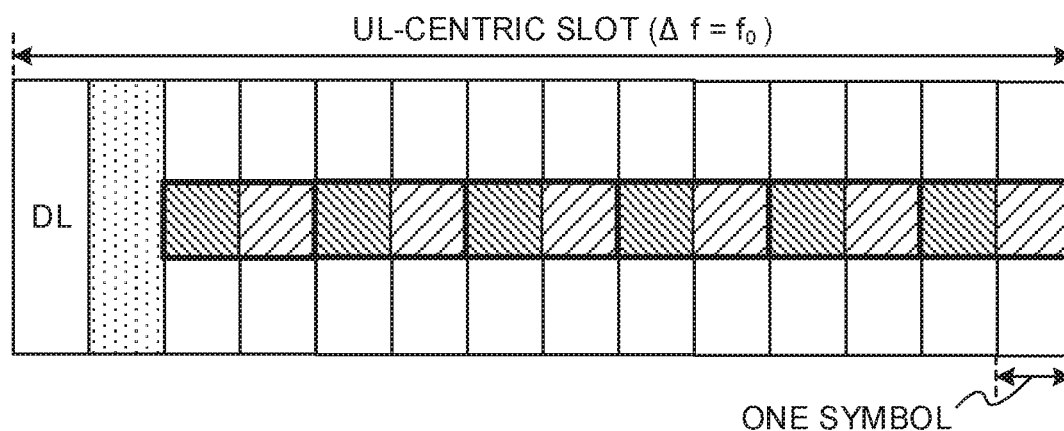

FIG. 3B illustrates an example of a slot (UL-centric slot), in which DL signals (for example, the PDCCH) are transmitted/received in a predetermined number of symbols (here, the first one symbol), and UL signals are transmitted/ received in the rest of the symbols. In the UL-centric slot, a symbol (gap period) for switching between DL and UL may be provided.

In the UL-centric slot of FIG. 3B, the long PUCCH is placed over twelve symbols for UL signals. The long PUCCH is formed by arranging six PUCCH units, which are constituted by short PUCCHs, along the time direction. With the short PUCCHs shown in FIG. 3B, UCI is mapped over six symbols in different PUCCH units, using at least one of spreading, repetition and coding. The radio base station synthesizes the UCI mapped to these six symbols.

Note that, in the long PUCCH, the UCI may be spread, repeated or encoded over these multiple PUCCH units (the UCI may be mapped to a plurality of symbols over these multiple PUCCH units by using at least one of spreading, repetition and coding).

In addition, the radio base station may receive a plurality of PUCCH units that constitute a long PUCCH, combine the UCI mapped to a plurality of symbols in these multiple PUCCH units, and improve the performance and/or the reliability of UCI.

Thus, when a short PUCCH serves as one PUCCH unit and a long PUCCH is formed by combining a plurality of PUCCH units, the formats of UL control channels having different durations can be made simple and/or common. Nevertheless, making the formats of a plurality of UL control channels having different durations simple and/or common might result in arranging reference signals in an increased number of symbols, and there is a possibility that UCI cannot be transmitted properly.

For example, in the short PUCCHs shown in FIG. 2A and FIG. 2B, the ratio of the number of RS symbols to the number of all symbols constituting these short PUCCHs (also referred to as "RS density" and/or the like) is fixed to 1/2. In this case, if these short PUCCHs each serve as one PUCCH unit and a long PUCCH is comprised of a plurality of PUCCH units, the RS density is 1/2. If the payload of UCI increases when the RS density is 1/2, it may not be possible to transmit the UCI properly.

Therefore, the present inventors have found out that, by setting the RS density of a short PUCCH to 1/2 or less, and by using this short PUCCH, or a long PUCCH that includes a plurality of PUCCH units each constituted by the short PUCCH, proper transmission of UCI is made possible.

Now, the present embodiment will be described below in detail. Note that, in the present embodiment, the user terminals support one or more subcarrier spacings (for example, at least one of 15 kHz, 30 kHz, 60 kHz, 120 kHz, 240 kHz, etc.). Hereinafter, assume that the subcarrier spacing ($\Delta f$) for data symbol is $f_0$ (for example, $f_0$=15 kHz). The subcarrier spacing in a short PUCCH and/or a long PUCCH may be the same as that of data symbols, or may be higher than that of data symbols.

(First Aspect)

With a first aspect of the present invention, the format of a short PUCCH will be described (a UL control channel of the first duration). According to the first aspect, the RS density of the short PUCCH (the ratio of the number of symbols in which RSs are arranged, to the number of all symbols in the short PUCCH duration) is 1/2 or less. In addition, the short PUCCH is the minimum unit to constitute UL control channels, and is also referred to as the "PUCCH unit" and so on.

The number of symbols in the short PUCCH duration is controlled by adjusting subcarrier spacing. For example, if the duration of the short PUCCH matches one symbol of subcarrier spacing $f_0$, two symbols of subcarrier spacing $2f_0$, four symbols of subcarrier spacing $4f_0$ and eight symbols of subcarrier spacing $8f_0$ are included in this duration.

Also, in the short PUCCH, UCI and an RS (for example, the DMRS) are at least time-division-multiplexed (TDM). When UCI and RS are time-division-multiplexed (TDM), either a multi-carrier waveform (for example, the OFDM waveform) or a single-carrier waveform (for example, the DFT-s-OFDM waveform) may be applied to the short PUCCH. Note that, when a multi-carrier waveform is employed, the UCI and the RS may be frequency-division-multiplexed (FDM) in the short PUCCH (for example, arranged in subcarriers shaped like the teeth of a comb).

The RS density in this short PUCCH may be determined in advance. Alternatively, information about the RS density (RS density information) may be reported from the network (for example, a radio base station) to the user terminals via higher layer signaling and/or physical layer signaling (L1 signaling). The RS density information includes at least one of, for example, the RS density, the number of all symbols constituting the short PUCCH, the number of symbols in which RSs are arranged in the short PUCCH, the number of all frequency resources for the short PUCCH and the number of RS frequency resources.

Furthermore, the positions of RSs (RS positions) in the short PUCCH may be determined in advance. Alternatively, information about RS positions (RS position information) may be reported from the network (for example, a radio base station) to the user terminals via higher layer signaling and/or physical layer signaling (L1 signaling). The RS position information indicates at least one of, for example, the relative position of an RS in the short PUCCH in the time direction (for example, the first symbol), its absolute position in the time direction (for example, the symbol index), and its frequency position (for example, the comb index).

Based on at least one of a predetermined RS density, the above RS density information, a predetermined RS position and the above RS position information, a user terminal controls the arrangement of RSs in the short PUCCH.

<Format of Short PUCCH>

Figure 4A:
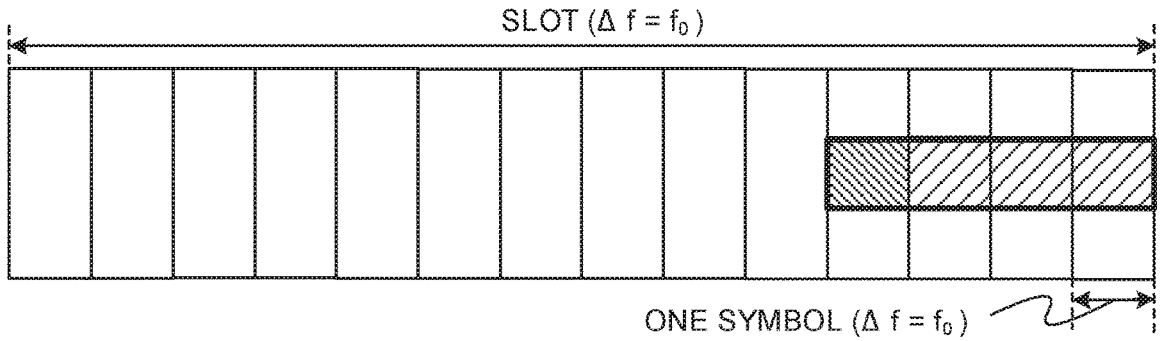
FIG. 4A to FIG. 4C are diagrams, each showing a first example of the format of a short PUCCH according to a first aspect of the present invention.
Figure 4B:
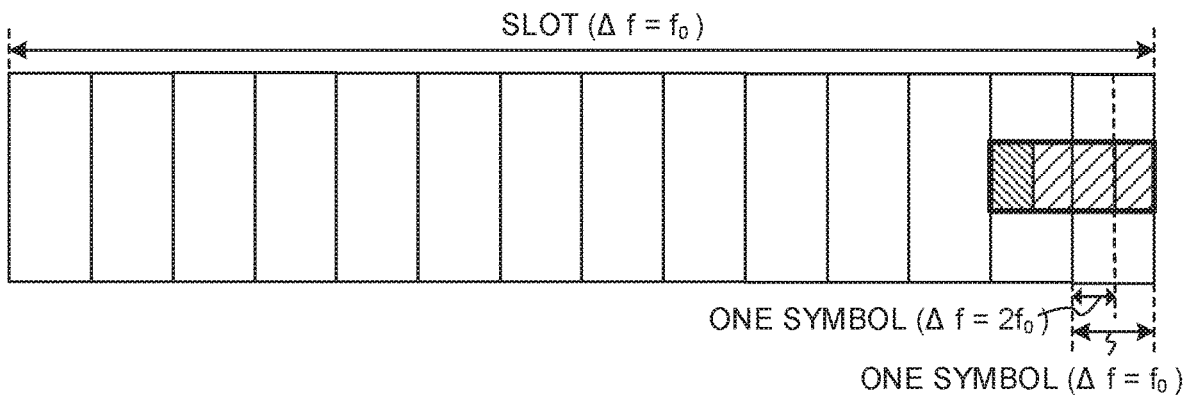
Figure 4C:
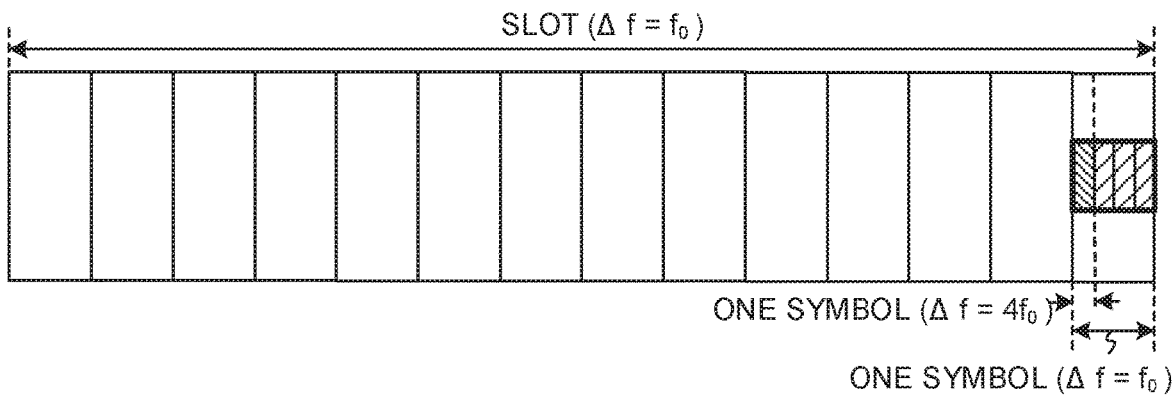

Now, with reference to FIGS. 4 to 6, the format of the short PUCCH according to the first aspect of the present invention will be described. FIG. 4 provide diagrams, each showing a first example of the format of a short PUCCH according to the first aspect. FIG. 4A to FIG. 4C show examples where the RS density is 1/4 in short PUCCHs of different subcarrier spacings ($\Delta f$). For example, in FIG. 4A, the short PUCCH is comprised of four symbols having subcarrier spacing $f_0$, which is the same as that of data symbols. Moreover, in each of FIG. 4B and FIG. 4C, the short PUCCH is comprised of four symbols, having subcarrier spacing $2f_0$ or $4f_0$, which is higher than that of data symbols.

As shown in FIG. 4B and FIG. 4C, when the subcarrier spacing in a short PUCCH is twice or four times the case illustrated in FIG. 4A, even if the number of symbols in the short PUCCH remains the same, the duration of the short PUCCH is 1/2 or 1/4 of the case shown in FIG. 4A.

For example, in FIGS. 4A, 4B and 4C, the RS density in the short PUCCH is configured to 1/4, so that RS is allocated to the first one symbol among the four symbols constituting the short PUCCH, and UCI is allocated to the remaining three symbols. Note that the symbol for arranging RS is not limited to the first symbol.

FIG. 5 provide diagrams, each showing a second example of the format of a short PUCCH according to the first aspect. FIG. 5A to FIG. 5D show examples in which the RS density is 1/8 in short PUCCHs of different subcarrier spacings ($\Delta f$).

Figure 5A:
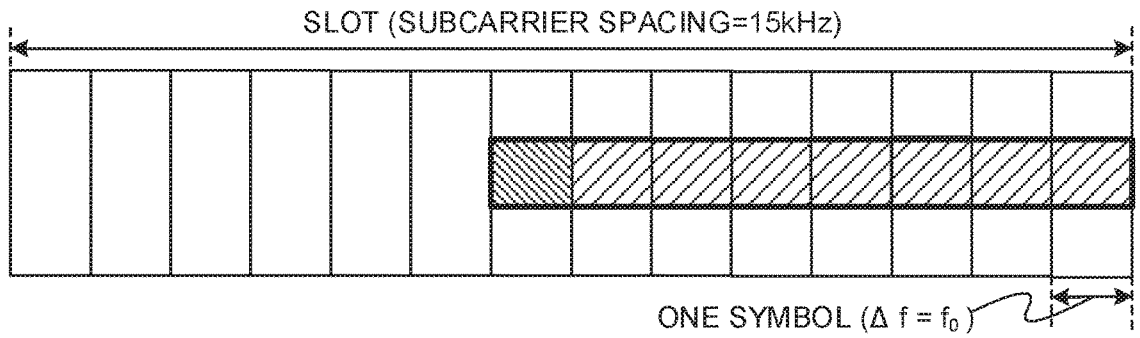
FIG. 5A to FIG. 5D are diagrams, each showing a second example of the format of a short PUCCH according to the first aspect.

In FIG. 5A, the short PUCCH is comprised of eight symbols having subcarrier spacing $f_0$, which is the same as that of data symbols. In each of FIGS. 5B, 5C and 5D, the short PUCCH is comprised of eight symbols, having subcarrier spacing $2f_0$, $4f_0$ or $8f_0$, which is higher than that of data symbols.

Figure 5B:
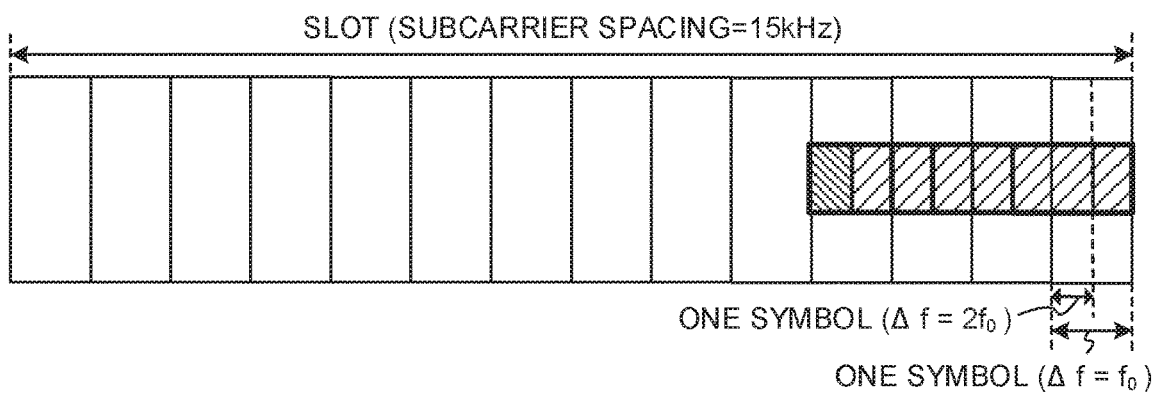
Figure 5C:
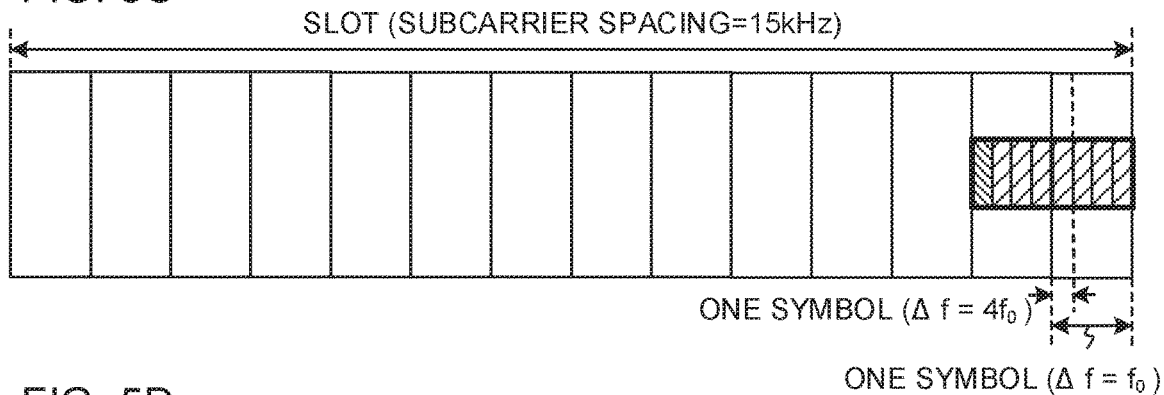
Figure 5D:
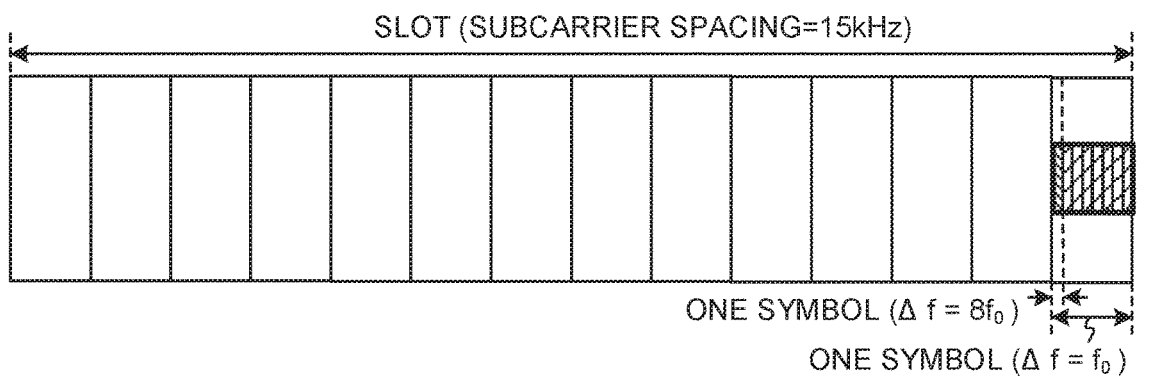

As shown in FIGS. 5B, 5C and 5D, when the subcarrier spacing in a short PUCCH is two times, four times or eight times the case illustrated in FIG. 5A, even if the number of symbols in the short PUCCH remains the same, the duration of the short PUCCH is 1/2, 1/4 or 1/8 of the case shown in FIG. 5A.

For example, in FIGS. 5A, 5B and 5C, the RS density in the short PUCCH is configured to 1/8, so that, among the eight symbols constituting the short PUCCH, RS is arranged in the first one symbol, and UCI is arranged in the remaining seven symbols. Note that the symbol for arranging RS is not limited to the first symbol.

As shown in FIG. 4 and FIG. 5, when the subcarrier spacing ($\Delta f$) constituting a short PUCCH is adjusted, it is possible to change the duration of the short PUCCH, without changing the number of symbols or the RS density in the short PUCCH. Therefore, the flexibility of PUCCH units formed with this short PUCCH can be improved.

FIG. 6 provide diagrams, each showing a third example of the format of a short PUCCH according to the first aspect. FIG. 6A to FIG. 6B show examples in which the RS density in short PUCCHs of different subcarrier spacings ($\Delta f$) is smaller than 1/2.

In FIG. 6A and FIG. 6B, the short PUCCH is comprised of two symbols with subcarrier spacing $f_0$ and/or $2f_0$. In a short PUCCH of two symbols, UCI and RS may be time-division-multiplexed (TDM) and also frequency-division-multiplexed (FDM). For example, referring to FIG. 6A and FIG. 6B, in the symbol in which RS is arranged, different combs are assigned to the UCI and the RS (the RS is combed-out).

As shown in FIG. 6, when UCI and RS are time-division-multiplexed (TDM) and frequency-division-multiplexed (FDM), even when a short PUCCH is comprised of two symbols, the RS density can be made smaller than 1/2. Furthermore, since the payload of the short PUCCH can be increased, the coding gain of UCI can be improved, and its performance can be improved.

<Bandwidth of Short PUCCH>

Figure 8A:
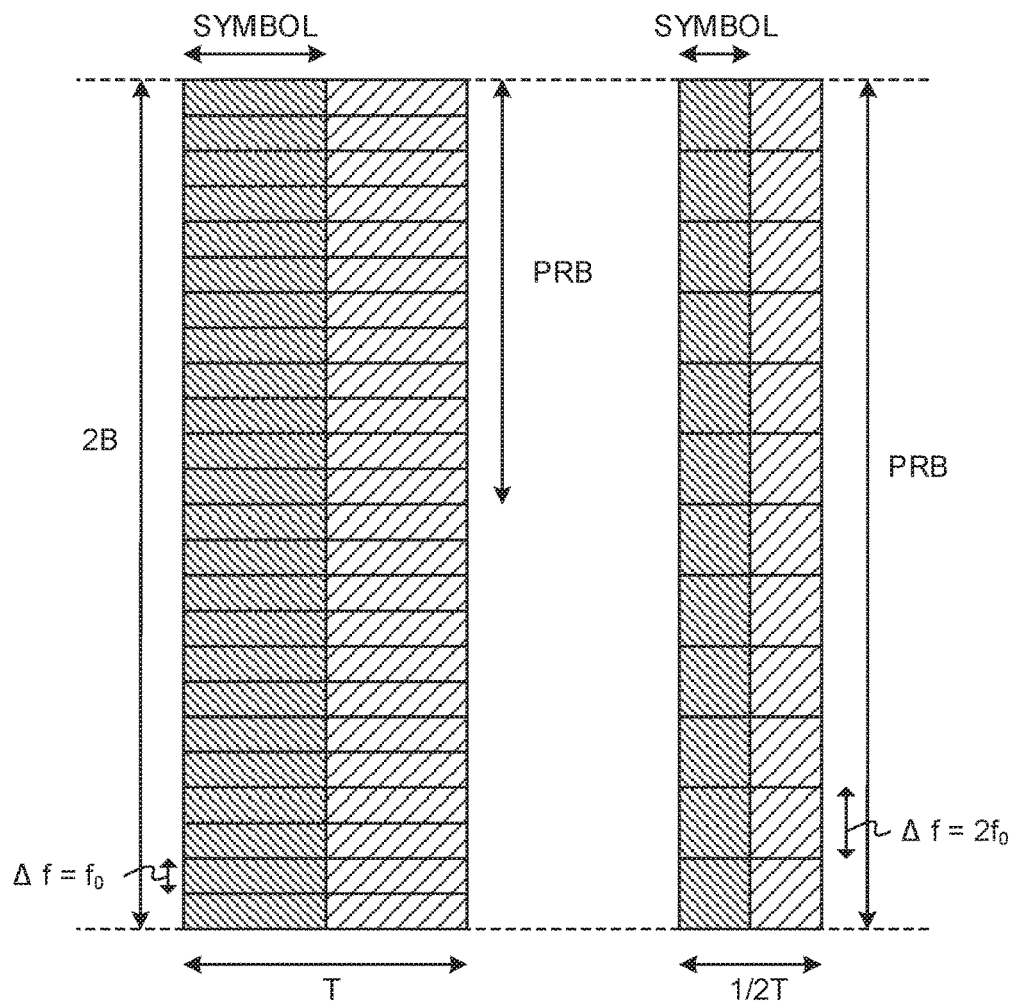
FIG. 8A and FIG. 8B are diagrams, each showing an example of control of a short PUCCH according to the first aspect.
Figure 8B:
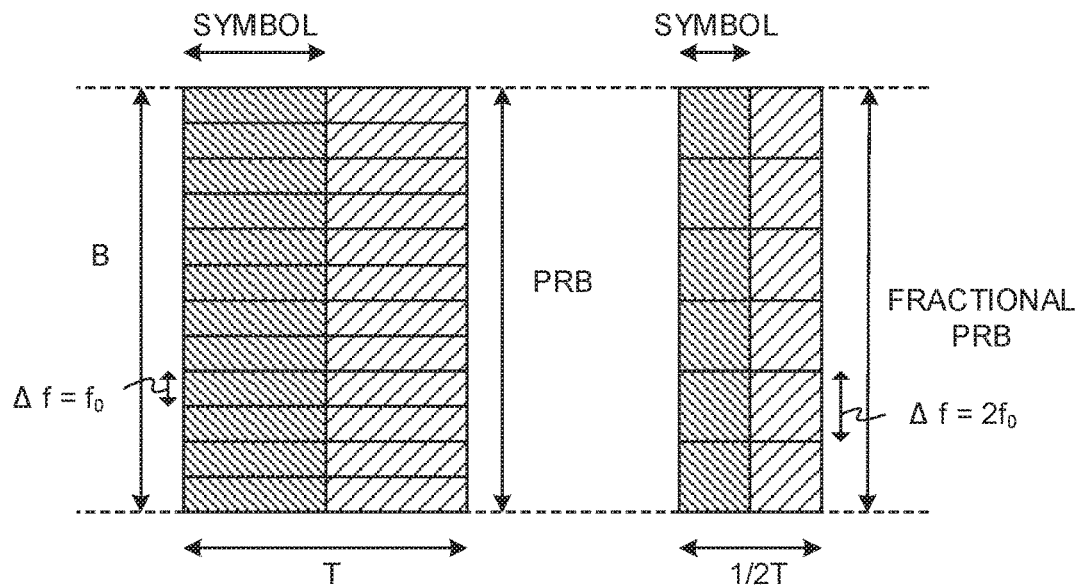
Figure 9:
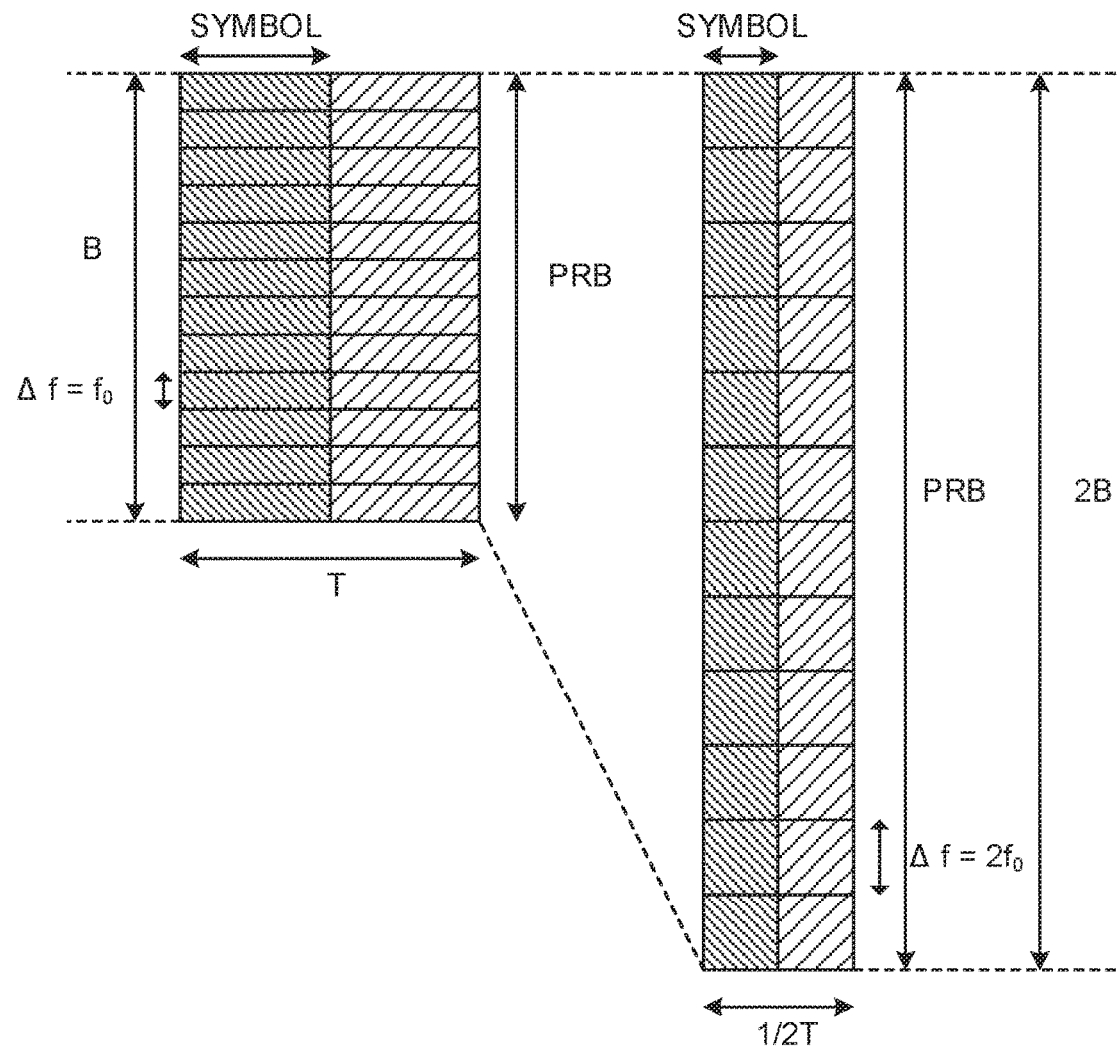
FIG. 9 is a diagram to show another example of control of a short PUCCH according to the first aspect.

With reference to FIG. 7 to FIG. 9, the bandwidth of short PUCCHs having different subcarrier spacings ($\Delta f$) will be explained. When short PUCCHs have varying subcarrier spacings ($\Delta f$), the bandwidth may be constant, or may be changed in accordance with every subcarrier spacing.

Figure 7A:
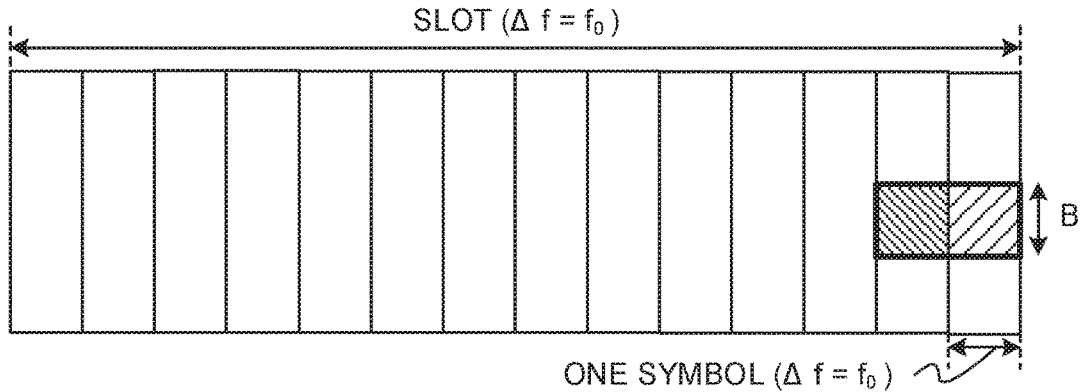
FIG. 7A to FIG. 7C are diagrams, each showing an example of the bandwidth of the short PUCCH according to the first aspect.
Figure 7B:
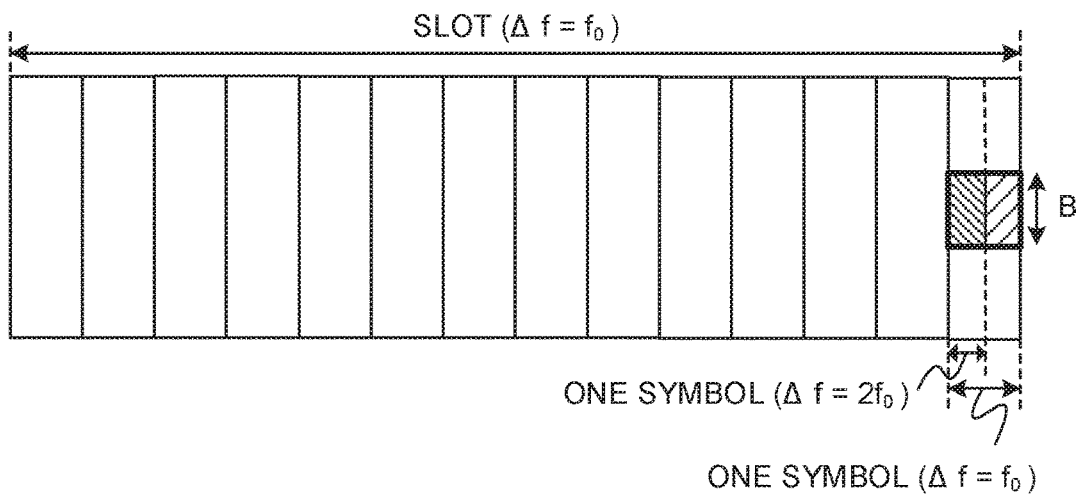
Figure 7C:
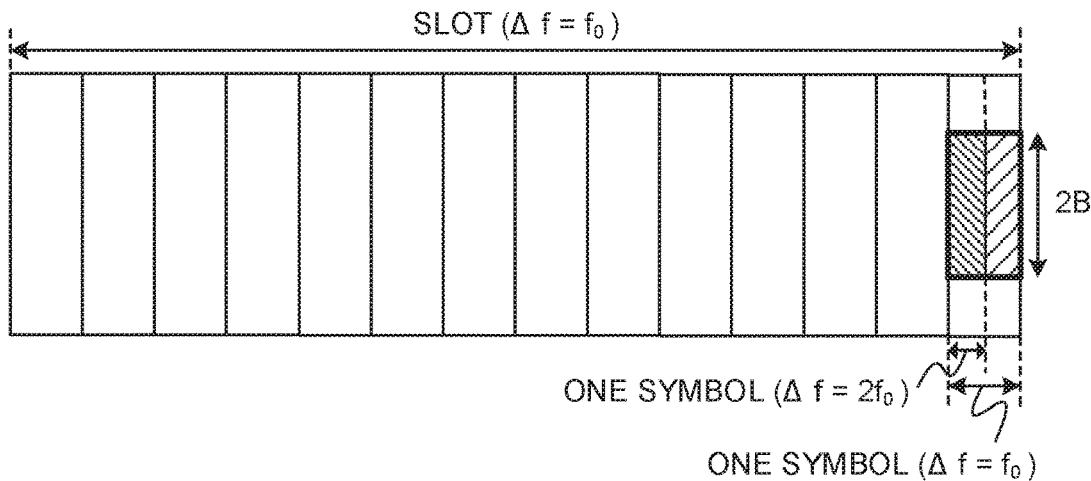

FIG. 7 provide diagrams, each showing an example of the bandwidth of a short PUCCH according to the first aspect. FIG. 7A shows a short PUCCH that is comprised of two symbols with subcarrier spacing $f_0$. FIG. 7B and FIG. 7C each show a short PUCCH comprised of two symbols with subcarrier spacing $2f_0$, which is twice that of FIG. 7A.

When the subcarrier spacing in a short PUCCH is changed to twice that of FIG. 7A, as shown in FIG. 7B, the bandwidth of this short PUCCH may be maintained as the same bandwidth (B) as in FIG. 7A. Alternatively, as shown in FIG. 7C, the bandwidth of this short PUCCH may be expanded to twice the bandwidth (2B) of FIG. 7A.

<Constant Bandwidth>

FIG. 8 provide diagrams, each showing an example of control of a short PUCCH according to the first aspect. FIG. 8A and FIG. 8B show cases where, as has been described with FIG. 7B, the bandwidth of a short PUCCH is maintained even when the subcarrier spacing in the short PUCCH is increased.

In FIG. 8A, the short PUCCH is comprised of two symbols having subcarrier spacing $f_0$, and twenty-four subcarriers (two PRBs if one PRB is twelve subcarriers) are allocated to this short PUCCH. In FIG. 8A, when the subcarrier spacing of the short PUCCH is changed from $f_0$ to $2f_0$, even if the short PUCCH is formed with two symbols, the duration of this short PUCCH becomes 1/2.

Referring to FIG. 8A, in the event the bandwidth of the short PUCCH (2 B) is to be maintained before and after the subcarrier spacing is changed, twelve subcarriers (one PRB if one PRB is twelve subcarriers) are allocated to the short PUCCH of subcarrier spacing $2f_0$. Thus, in FIG. 8A, the bandwidth of the short PUCCH (2B) is maintained before and after the subcarrier spacing is changed, without changing the number of subcarriers per PRB (12).

In FIG. 8A, the bandwidth of the short PUCCH having base subcarrier spacing $f_0$ is comprised of two or more PRBs, assuming that subcarrier spacing $f_0$ may be changed to higher subcarrier spacing (for example, $2f_0$, $4f_0$ and $8f_0$, etc.).

On the other hand, in FIG. 8B, twelve subcarriers (one PRB if one PRB is twelve subcarriers) are allocated to a short PUCCH that is comprised of two symbols having subcarrier spacing $f_0$. Referring to FIG. 8B, in the event the bandwidth of the short PUCCH (B) is to be maintained before and after the subcarrier spacing is changed, only six subcarriers can be allocated to the short PUCCH of subcarrier spacing $2f_0$.

So, in FIG. 8B, the number of subcarriers per PRB (for example, six subcarriers per PRB) is reduced. One PRB (fractional PRB) with a reduced number of subcarriers is allocated to the short PUCCH of subcarrier spacing $2f_0$.

In FIG. 8B, the number of subcarriers per PRB is changed, so that, even if subcarrier spacing $f_0$ is changed to higher subcarrier spacing (for example, $2f_0$, $4f_0$, $8f_0$, etc.), it is still possible to maintain the bandwidth of the short PUCCH before and after the subcarrier spacing is changed.

As shown in FIG. 8, when the bandwidth of the short PUCCH is maintained before and after the change of the subcarrier spacing is changed, even though the payload of the short PUCCH decreases, it is possible to reduce the impact on the allocation of frequency resources for other user terminals, and facilitate the scheduling in the radio base station.

<Different Bandwidths>

FIG. 9 is a diagram to show another example of control of a short PUCCH according to the first aspect. FIG. 9 shows a case where, as has been described with FIG. 7C, when the subcarrier spacing in a short PUCCH is increased, the bandwidth of the short PUCCH also expands.

In FIG. 9, the short PUCCH is comprised of two symbols having subcarrier spacing $f_0$, and twelve subcarriers (one PRB if one PRB is twelve subcarriers) are allocated to the short PUCCH. In FIG. 9, when the subcarrier spacing in a short PUCCH is changed from $f_0$ to $2f_0$, even when the short PUCCH is comprised of two symbols, the duration of the short PUCCH becomes 1/2.

In FIG. 9, since the subcarrier spacing is doubled, the bandwidth of the short PUCCH is also doubled. In FIG. 9, the number of subcarriers (the number of PRBs) to be allocated to the short PUCCH is twelve (one PRB), and the same before and after the subcarrier spacing is changed.

As shown in FIG. 9, when the bandwidth of a short PUCCH is changed following a change of subcarrier spacing, the number of frequency resources (the number of subcarriers and/or the number of PRBs) to allocate to the short PUCCH can be made equal before and after the subcarrier spacing is changed, so that the payload of this short PUCCH can be maintained.

(Second Aspect)

With a second aspect of the present invention, the format of a long PUCCH (a UL control channel of a second duration) will be described. According to the second aspect, a long PUCCH includes a plurality of PUCCH units, and each PUCCH unit is comprised of the short PUCCH according to the first aspect. As has been explained with the first aspect, each PUCCH unit has an RS density of 1/2 or less, so that the RS density (the ratio of the number of symbols in which RS is arranged, to the number of all symbols in the duration of the long PUCCH) of the long PUCCH, comprised of a plurality of PUCCH units, is also 1/2 or less.

In the time direction, at least two of the multiple PUCCH units constituting the long PUCCH may be structured the same and/or structured differently. Here, the format (also referred to as "configuration," "structure," and so on) of a PUCCH unit may include at least one of the number of symbols in the PUCCH unit, the RS density, the subcarrier spacing, the duration and the RS position.

Also, if the duration that can be used for the long PUCCH is not equal to an integer multiple of the duration of one PUCCH unit, in at least one of the multiple PUCCH units constituting the long PUCCH, symbols where UCI and/or RS are arranged may be punctured or repeated.

The format of the long PUCCH may be defined in advance, information about the format of the long PUCCH (long PUCCH format information) may be reported from the network (for example, a radio base station) to the user terminals via higher layer signaling and/or physical layer signaling. The long PUCCH format information may represent at least one of the number of PUCCH units in the long PUCCH, the structure of each PUCCH unit in the long PUCCH units, and information about puncturing or repetition in at least one PUCCH unit.

The user terminal controls the arrangement of RSs in the long PUCCH based on the predetermined format and/or the above long PUCCH format information.

<Format of Long PUCCH in Time Direction>

With reference to FIG. 10 to FIG. 13, the format of a long PUCCH in the time direction will be described. A long PUCCH may be comprised of a plurality of PUCCH units of the same format, may be comprised of a plurality of PUCCH units of different formats, or may be structured to include a plurality of PUCCH units of the same format and a plurality of PUCCH units of different formats.

<Same Format>

Figure 10A:
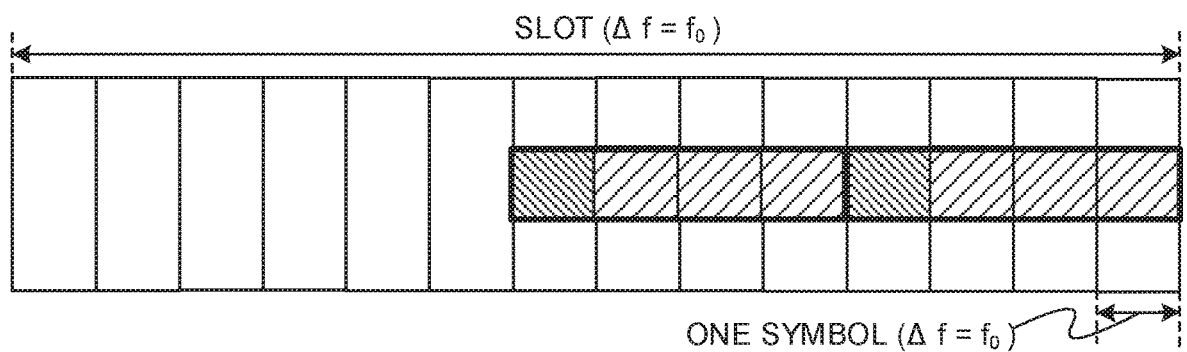
FIG. 10A and FIG. 10B are diagrams, each showing a first example of the format of a long PUCCH in the time direction, according to a second aspect of the present invention.
Figure 10B:
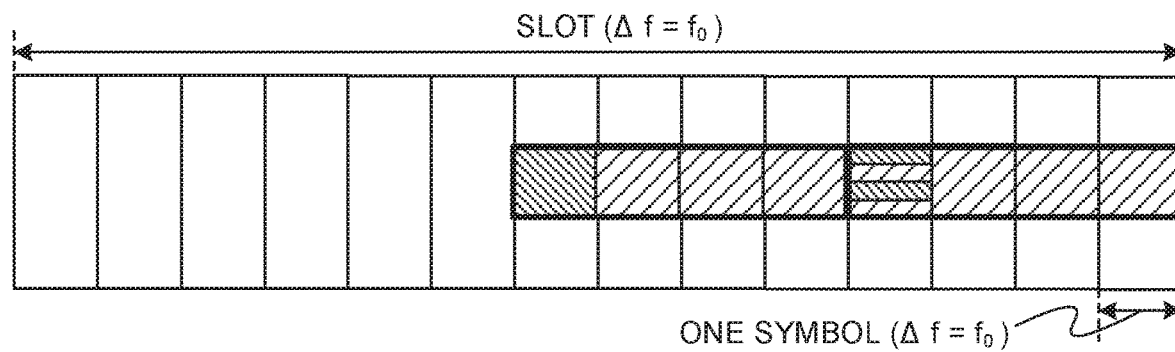

FIG. 10 is a diagram to show a first example of the format of a long PUCCH in the time direction according to the second aspect. FIG. 10A and FIG. 10B show cases where a long PUCCH includes two PUCCH units of the same format (here, the number of symbols, the subcarrier spacing, the RS density and the duration).

For example, in FIG. 10A, each PUCCH unit is comprised of four symbols with subcarrier spacing $f_0$. Also, RS is allocated to the first symbol in each PUCCH unit, and time-division-multiplexed with UCI. Meanwhile, as shown in FIG. 10B, in at least one PUCCH unit constituting a long PUCCH, RS and UCI may be frequency-division-multiplexed in a symbol in which the RS is arranged (RS may be arranged (may be combed out) in subcarriers shaped like the teeth of a comb).

Figure 11A:
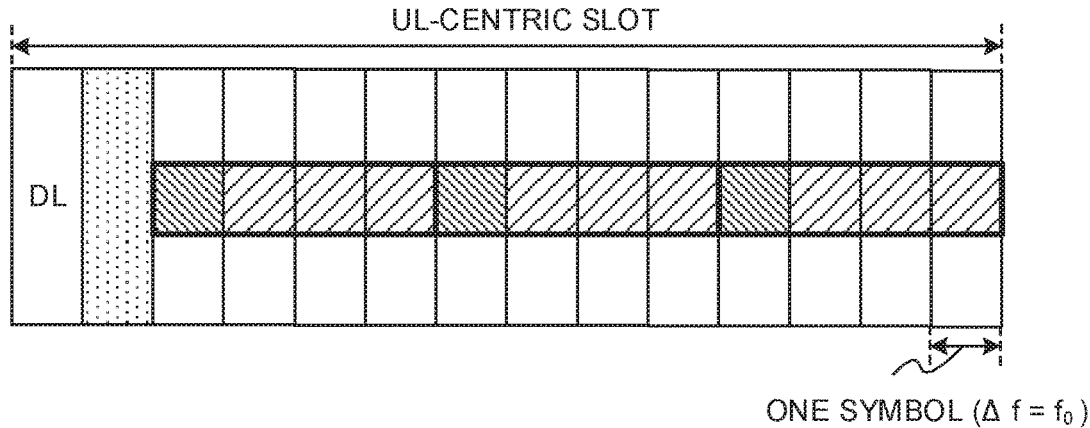
FIG. 11A to FIG. 11C are diagrams, each showing a second example of the format of a long PUCCH in the time direction according to the second aspect.
Figure 11B:
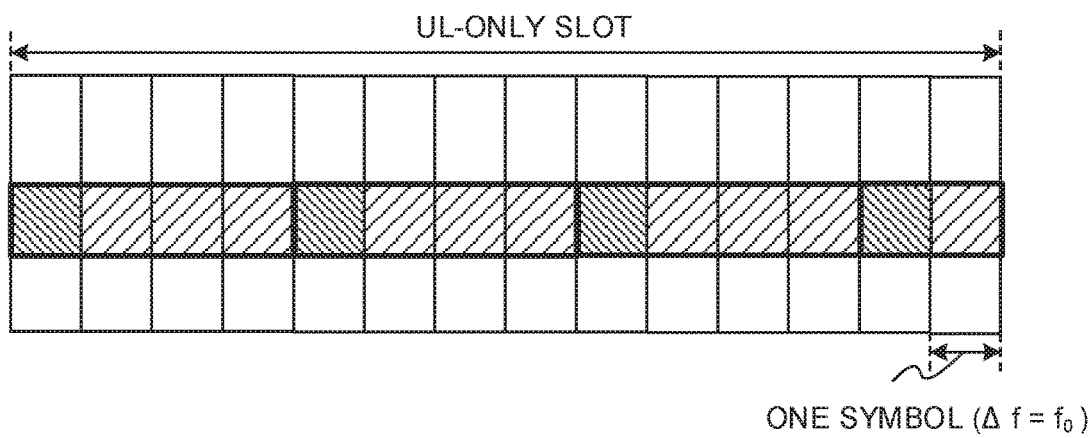
Figure 11C:
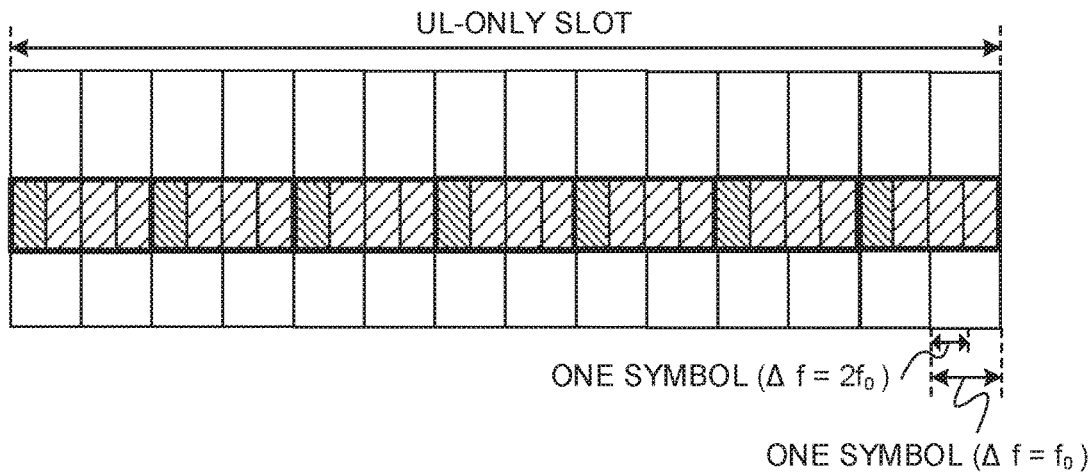

FIG. 11 provide diagrams, each showing a second example of the format of a long PUCCH in the time direction according to the second aspect. FIG. 11A to FIG. 11C show cases in which a long PUCCH includes a plurality of PUCCH units having the same format (here, the number of symbols, the subcarrier spacing, the RS density, the duration and the RS position). For example, in FIG. 11A and FIG. 11B, the long PUCCH includes a plurality of PUCCH units sharing the number of symbols (four symbols), the RS density (1/2), the duration and the RS position (first symbol) in common.

When, as shown in FIG. 11A, twelve symbols with subcarrier spacing $f_0$ are available for use for a long PUCCH, it is possible to form a long PUCCH by combining three PUCCH units formed with four symbols of subcarrier spacing $f_0$. Meanwhile, when, as shown in FIG. 11B and FIG. 11C, fourteen symbols with subcarrier spacing $f_0$ are available for use for a long PUCCH, if three PUCCH units are combined as described above, two symbols will be left.

So, as shown in FIG. 11B, one or more symbols may be punctured in at least one PUCCH unit constituting the long PUCCH. For example, in FIG. 1B, the fourth PUCCH unit from the left has two UCI symbols punctured, and is formed with two symbols.

Note that, although not shown, in FIG. 11B, one or more symbols may be repeated in at least one PUCCH unit constituting the long PUCCH. For example, in FIG. 11B, instead of using PUCCH units comprised of two symbols, the number of symbols in one PUCCH unit may be increased to six, or the number of symbols in two PUCCH units may be increased to five.

Thus, in at least one of a plurality of PUCCH units forming a long PUCCH, symbols where UCI and/or RS are arranged are punctured or repeated, so that it is possible to arrange the long PUCCH, without leaving an unused portion in the duration that is available to the long PUCCH.

Alternatively, as shown in FIG. 11C, the subcarrier spacing in each PUCCH unit constituting the long PUCCH may be adjusted, so that the long PUCCH unit may be formed while maintaining the number of symbols per PUCCH unit.

For example, as shown in FIG. 11C, when the subcarrier spacing in each PUCCH unit constituting a long PUCCH is changed from $f_0$ to $2f_0$, the duration of one PUCCH unit is equal to two symbols of subcarrier spacing $f_0$. In this case, the duration that is available for use for the long PUCCH (fourteen symbols of subcarrier spacing $f_0$) is an integral multiple of (seven times) the duration of one PUCCH unit (two symbols of subcarrier spacing $f_0$).

Note that, although, in FIG. 11C, the subcarrier spacing in each PUCCH unit is changed from $f_0$ to $2f_0$, when the number of symbols per PUCCH unit is maintained at four, even if the subcarrier spacing is changed to $4f_0$ or $8f_0$ and so on, it is still possible to make the duration available for the long PUCCH an integral multiple of the duration of one PUCCH unit (fourteen times as large in the event of $4f_0$ or twenty-eight times as large in the event of $8f_0$).

In FIG. 11, the long PUCCH is comprised of a plurality of PUCCH units of the same format, for example, even when at least one of spreading, repetition and coding of the same UCI is applied over these multiple PUCCH units, it is still possible to perform the UCI transmission process in user terminals with ease.

<Different Formats>

FIG. 12 provide diagrams, each showing a third example of the format of a long PUCCH in the time direction according to the second aspect. FIG. 12A and FIG. 12B show cases where a long PUCCH includes a plurality of PUCCH units having different formats (here, the number of symbols and the RS density).

In FIG. 12A, the long PUCCH is comprised of PUCCH unit #1 including two symbols, PUCCH unit #2 including four symbols and PUCCH unit #3 including eight symbols. The RS density in PUCCH unit #1 is 1/2, the RS density in PUCCH unit #2 is 1/4 and the RS density in PUCCH unit #3 is 1/8.

In FIG. 12B, the long PUCCH is comprised of PUCCH unit #1 including four symbols and PUCCH unit #2 including eight symbols. The RS density in PUCCH unit #1 is 1/4, and the RS density in PUCCH unit #2 is 1/8.

In this way, when a long PUCCH is formed with a plurality of PUCCH units having different numbers of symbols and/or different RS densities, it is possible to configure a long PUCCH in a flexible manner. Note that, the same UCI may be transmitted in these multiple PUCCH units, or different UCIs (different UCIs of the same user terminal or UCIs of different user terminals) may be transmitted.

<Format in Frequency Direction>

With reference to FIG. 13 and FIG. 14, the format of a long PUCCH in the frequency direction will be described. At least two of a plurality of PUCCH units included in a long PUCCH are arranged in the same frequency resource and/or different frequency resources. Note that, in FIG. 13 and FIG. 14, the long PUCCH is structured as shown in FIG. 11A and FIG. 11B, but the format of the long PUCCH to which frequency hopping is applied is by no means limited to this.

Figure 13A:
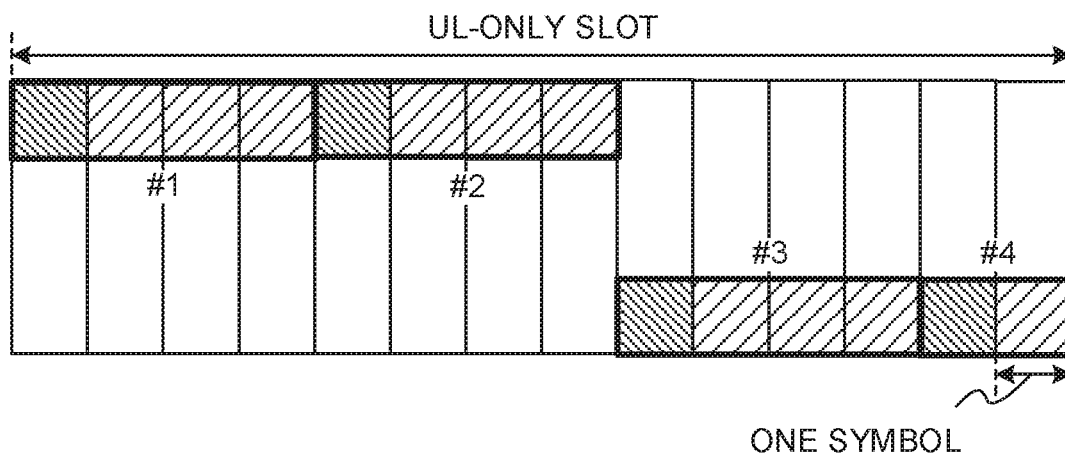
FIG. 13A and FIG. 13B are diagrams, each showing a first example of the format of a long PUCCH in the frequency direction, according to the second aspect.
Figure 13B:
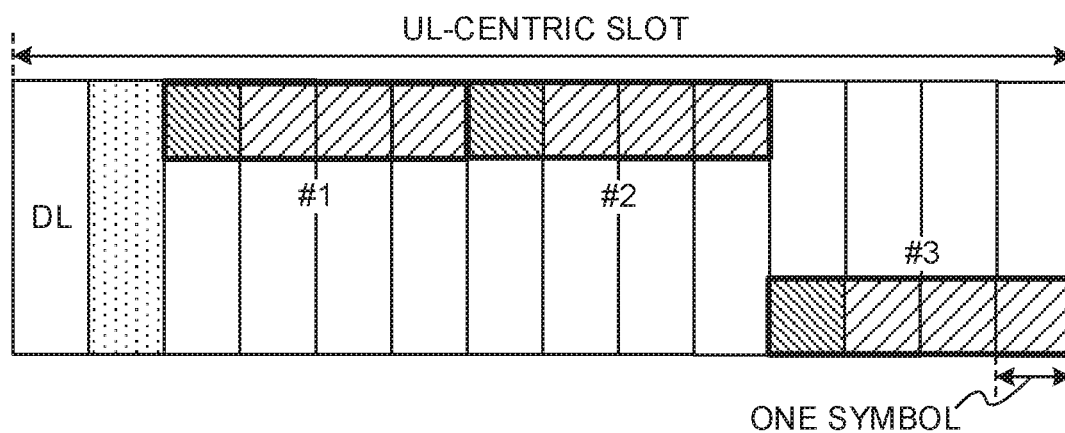

FIG. 13 provide diagrams, each showing a first example of the format of a long PUCCH in the frequency direction according to the second aspect. In FIG. 13A, the long PUCCH includes PUCCH units #1 to #4, and two symbols are punctured in PUCCH unit #4. On the other hand, in FIG. 13B, the long PUCCH includes PUCCH units #1 to #3.

As shown in FIG. 13A and FIG. 13B, frequency hopping may be applied every one or more consecutive PUCCH units in the long PUCCH. To be more specific, in FIG. 13A and FIG. 13B, a predetermined number of PUCCH units in the first half and a predetermined number of PUCCH units in the second half are arranged in different frequency resources.

Here, these different frequency resources may be frequency resources at both ends of a predetermined band (for example, the band allocated to a user terminal), or may be a predetermined number of frequency resources (for example, an integer multiple of the PRBs) on the inner side from both ends. In FIG. 13A and FIG. 13B, first-half PUCCH units #1 and #2 are arranged in one of the frequency resources, and two PUCCH units or one PUCCH unit of the second half (PUCCH units #3 and #4 in FIG. 13A and PUCCH unit #3 in FIG. 13B) is arranged in the other one of the frequency resources.

The number of PUCCH units to be arranged in the same frequency resource in the long PUCCH may be equal (also referred to as "symmetric frequency hopping" and so on) or may vary (also referred to as "asymmetric frequency hopping" and so on). For example, in FIG. 13A, two PUCCH units are arranged in each of two frequency resources, and, in FIG. 13B, more PUCCH units are allocated to one of the frequency resources than in the other one of the frequency resources.

Figure 14A:
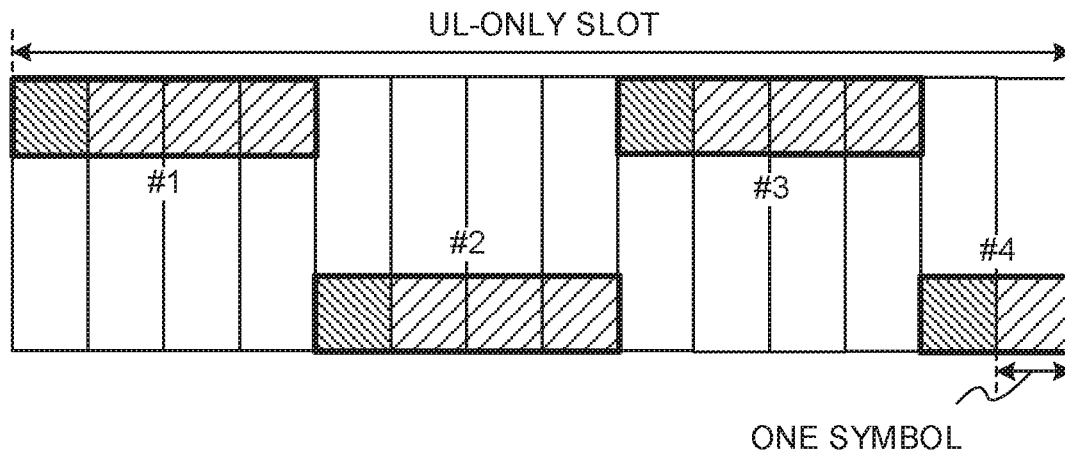
FIG. 14A and FIG. 14B are diagrams, each showing a second example of the format of a long PUCCH in the frequency direction, according to the second aspect.
Figure 14B:
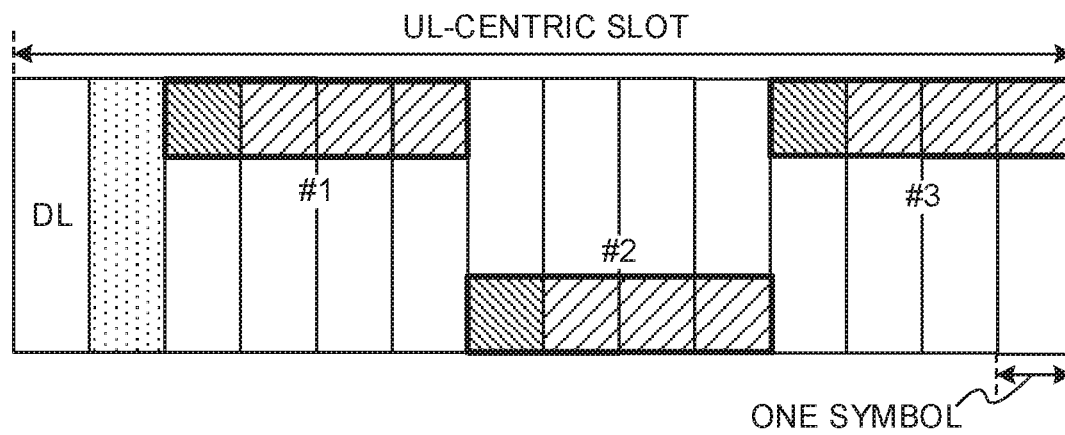

FIG. 14 provide diagrams, each showing a second example of the format of a long PUCCH in the frequency direction according to the second aspect. As shown in FIGS. 14A and 14B, frequency hopping may be applied to a long PUCCH per PUCCH unit. To be more specific, in FIG. 14A and FIG. 14B, frequency resources that hop per PUCCH resource may be allocated.

Note that although, in FIG. 14A and FIG. 14B, PUCCH units #1 and #3 are arranged in the same frequency resources, they may be arranged in different frequency resources as well. Similarly, in FIG. 14A, PUCCH units #2 and #4 are arranged in the same frequency resources, but they may be arranged in different frequency resources as well.

In this way, when frequency hopping is applied to a long PUCCH, frequency diversity gain can be achieved.

(Third Aspect)

Future radio communication systems are assumed to communicate using unlicensed bands. An unlicensed band refers to a band of an unlicensed spectrum that can be used other than apart from a licensed band, and a carrier of an unlicensed band (cell) is also referred to as an "unlicensed carrier (cell)," an "LAA (License-Assisted Access) carrier (cell)," "eLAA carrier (cell)," and so on.

In unlicensed carriers, a plurality of clusters arranged at equal intervals along the frequency direction over the entire band may be used as one resource unit, and uplink communication may be performed using one or more resource units (interlaced transmission). One resource unit including a plurality of clusters is also referred to as an "interlace," and each cluster is comprised of one or more frequency units (for example, PRBs and/or subcarriers).

Since it is assumed that the short PUCCH of the first aspect and the long PUCCH of the second aspect are transmitted in unlicensed bands, it is desirable to support interlaced transmission. So, with a third aspect of the present invention, interlaced transmission of the short PUCCH of the first aspect and the long PUCCH of the second aspect will be described.

According to the third aspect, one or more interlaces are allocated to the short PUCCH. Each interlace includes a plurality of clusters arranged at equal intervals spaced over the entire carrier (cell) band (also referred to as the "system band" and so on).

Also, according to the third aspect, a long PUCCH includes a plurality of PUCCH units, and each PUCCH unit is comprised of a short PUCCH to which one or more interlaces are assigned. FIG. 15 provide diagrams, each showing an example of the format of a long PUCCH according to the third aspect. Note that FIG. 15 presume cases where every interlace is comprised of four clusters, but the number of clusters in an interlace is not limited to four.

FIG. 15A shows an example of inter-slot hopping. In FIG. 15A, the long PUCCH of slot #0 is comprised of four PUCCH units where interlace #0 is allocated. On the other hand, the long PUCCH of slot #1 is comprised of four PUCCH units where interlace #1 is allocated.

Thus, a long PUCCH to be transmitted in interlaced transmission may be allocated different interlaces between slots. Note that, although FIG. 15A shows a case where the frequency offset between slots is one interlace, this is by no means limiting. Further, in FIG. 15A, slot #0 and slot #1 may constitute a single long PUCCH together, or slot #0 and slot #1 may form separate long PUCCHs.

FIG. 15B shows an example of intra-slot hopping. In FIG. 15B, the long PUCCH is allocated interlaces that shift per PUCCH unit within the slot. For example, interlaces #0, #1, #2 and #0 are allocated to each of the four PUCCH units constituting the long PUCCH of each slot.

Note that, although FIG. 15B shows a case where the frequency offset between PUCCH units is one interlace, this is by no means limiting. Also, in FIG. 15B, slots #0 and #1 may constitute a single long PUCCH together, or slots #0 and #1 may form separate long PUCCHs.

According to the third aspect, when a short PUCCH and/or a long PUCCH are supported in an unlicensed carrier, interlaced transmission of the short PUCCH and/or the long PUCCH can be performed adequately.

(Fourth Aspect)

With a fourth aspect of the present invention, an example of controlling the format of PUCCH units that constitute a short PUCCH (that is, PUCCH unit) or a long PUCCH will be described. Although, according to the first and second aspects, the format of PUCCH units is determined in advance or determined based on explicit command information from the network, but this format may be implicitly determined in user terminals in an implicit manner.

To be more specific, a user terminal may implicitly determine the format of PUCCH units based on the payload (the number of bits) and/or the UCI type of UCI. Here, UCI includes at least one of retransmission control information in response to DL data, (also referred to as "HARQ-ACK," "ACK/NACK," A/N," etc.), a scheduling request (SR), channel state information (CSI), beam-identifying information (beam index (BI), DM-RS antenna port number, etc.), buffer status report (BSR), power headroom (PHR), and other information. The UCI type refers to information that indicates the content of UCI, and represents, for example, at least one combination of the above.

Note that HARQ-ACK may be provided in response to one or more transport blocks (TBs), may be provided in response to one or more code blocks (CBs), may be provided in response to one or more component carriers (CCs) (cells), or may be provided in response to a combination of these. Also, CSI and/or BI may be provided in response to one or more slots, may be provided in response to one or more CCs (cells), or may be provided in response to a combination of these.

Figure 16A:
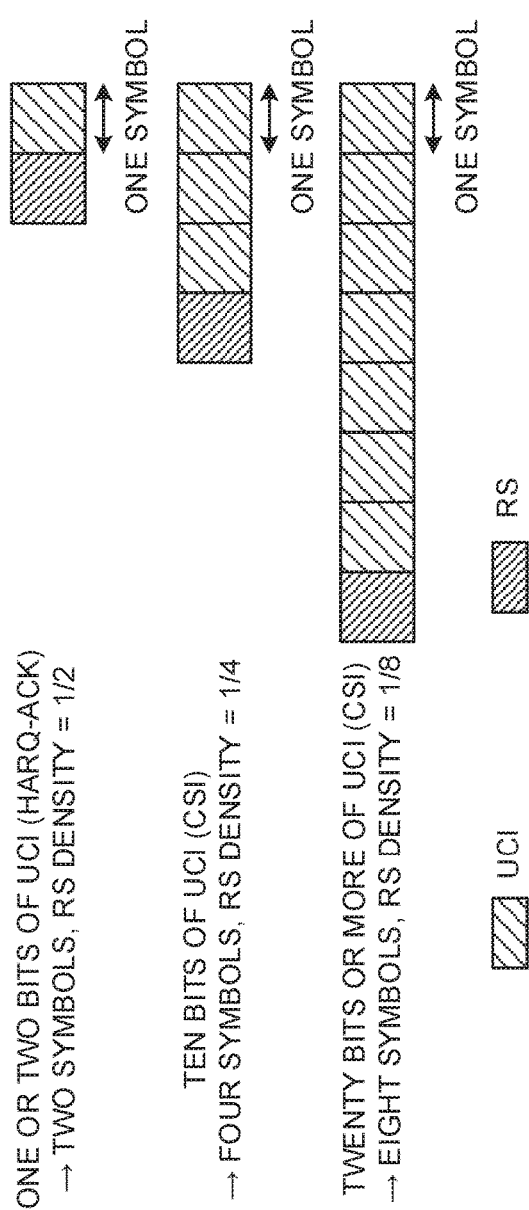
FIG. 16A and FIG. 16B are diagrams, each showing an example of control of a PUCCH format according to a fourth aspect of the present invention.

FIG. 16 provide diagrams, each showing an example of controlling the format of PUCCH units according to the fourth aspect. FIG. 16A illustrates an example where the number of symbols and the RS density are implicitly determined as the format of PUCCH units.

For example, as shown in FIG. 16A, when a user terminal transmits a one or two bits of UCI (for example, HARQ-ACK), the user terminal may decide to use a short PUCCH with two symbols and an RS density of 1/2. Furthermore, when the user terminal transmits ten bits of UCI (for example, CSI), the user terminal may decide to use a short PUCCH with four symbols and an RS density of 1/4. Furthermore, when the user terminal transmits twenty bits or more of UCI (for example, CSI), the user terminal may decide to use a short PUCCH with eight symbols and an RS density of 1/8.

Figure 16B:
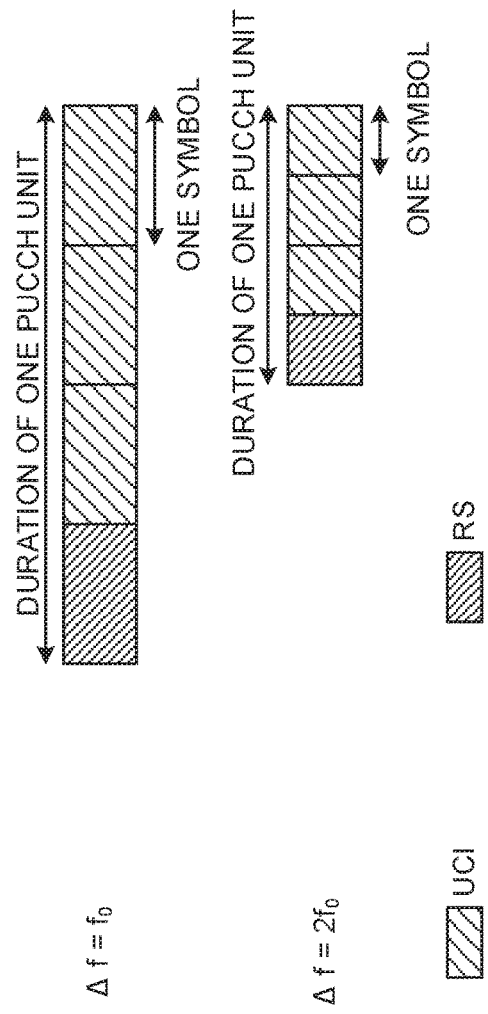

As shown in FIG. 16A, if the number of symbols and the RS density in a short PUCCH are determined based on the payload and/or the UCI type of UCI, the duration of the short PUCCH is controlled based on subcarrier spacing. For example, when, as shown in FIG. 16B, the number of symbols to constitute a short PUCCH is the same, if the subcarrier spacing doubles, the duration of the short PUCCH becomes 1/2.

Accordingly, the user terminal may decide the duration of this short PUCCH based on explicit information or implicit information from the network. For example, the user terminal may receive information (duration information) that indicates the duration of the short PUCCH from the network and determine on the duration indicated by this duration-related information. This duration information may be reported to the user terminal via higher later information and/or physical layer signaling.

Alternatively, the user terminal may determine the duration of the short PUCCH based on the subcarrier spacing of the slot (or minislot) in which this short PUCCH is placed. For example, when subcarrier spacing in a slot in which a short PUCCH of four symbols is arranged is $f_0$, the duration of this short PUCCH is determined to be four symbols of this subcarrier spacing $f_0$.

Alternatively, the user terminal may determine the duration of the short PUCCH based on the subcarrier spacing that is reported from the network.

Information to indicate this subcarrier duration (subcarrier spacing information) is reported to the user terminal via higher layer signaling and/or physical layer signaling.

According to the fourth aspect, the format of PUCCH units is determined in an implicit manner, so that the overhead in the network and the user terminal can be reduced.

(Radio Communication System)

Now, the structure of a radio communication system according to the present embodiment will be described below. In this radio communication system, each radio communication method according to the above-described embodiments is employed. Note that the radio communication methods according to the herein-contained aspects of the present invention may be applied individually, or two or more of them may be combined and applied.

Figure 17:
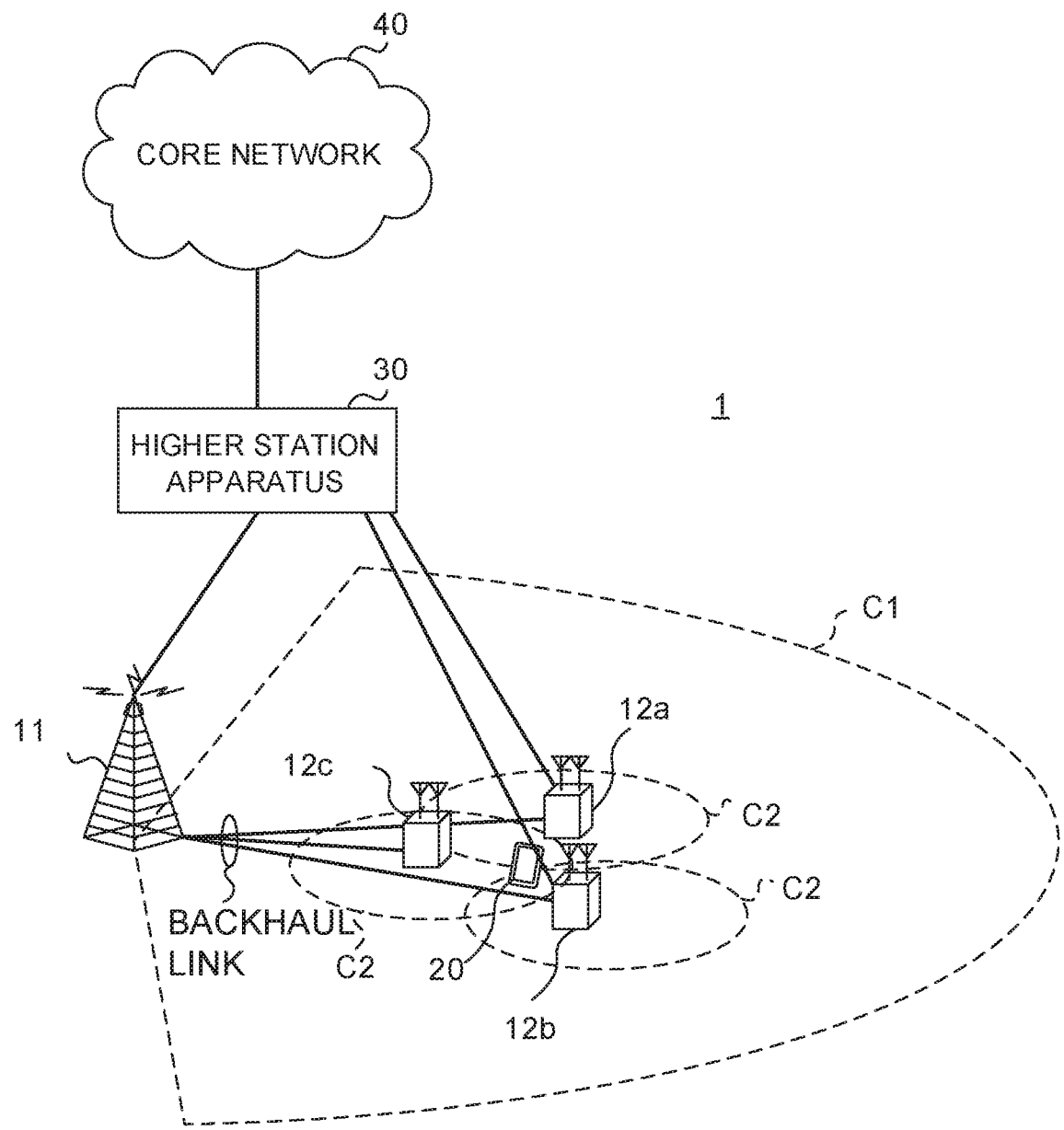
FIG. 17 is a diagram to show an example of a schematic structure of a radio communication system according to the present embodiment.

FIG. 17 is a diagram to show an example of a schematic structure of a radio communication system according to the present embodiment. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes one unit. The radio communication system 1 may be also referred to as "SUPER 3G," "LTE-A (LTE-Advanced)," "IMT-Advanced," "4G," "5G," "FRA (Future Radio Access)," "NR (New RAT: New Radio Access Technology)," and so on.

The radio communication system 1 shown in FIG. 17 includes a radio base station 11 that forms a macro cell C1, and radio base stations 12a to 12c that are placed within the macro cell C1 and that form small cells C2, which are narrower than the macro cell C1. Also, user terminals 20 are placed in the macro cell C1 and in each small cell C2. A structure in which different numerologies are applied between cells and/or within cells may be adopted.

Here, "numerology" refers to communication parameters in the frequency direction and/or the time direction (for example, at least one of the subcarrier spacing (subcarrier interval), the bandwidth, the symbol duration, the time duration of CPs (CP duration), the subframe duration, the time duration of TTIs (TTI duration), the number of symbols per TTI, the radio frame structure, the filtering process, the windowing process, and so on). In the radio communication system 1, for example, subcarrier spacing of, for example, 15 kHz, 30 kHz, 60 kHz, 120 kHz and 240 kHz may be supported.

The user terminals 20 can connect with both the radio base station 11 and the radio base stations 12. The user terminals 20 may use the macro cell C1 and the small cells C2, which use different frequencies, at the same time, by means of CA or DC. Also, the user terminals 20 can execute CA or DC by using a plurality of cells (CCs) (for example, two or more CCs). Furthermore, the user terminals can use license band CCs and unlicensed band CCs as a plurality of cells.

Furthermore, the user terminal 20 can perform communication using time division duplexing (TDD) or frequency division duplexing (FDD) in each cell. A TDD cell and an FDD cell may be referred to as a "TDD carrier (frame configuration type 2)," and an "FDD carrier (frame configuration type 1)," respectively.

Furthermore, in each cell (carrier), a single numerology may be employed, or a plurality of different numerologies may be employed.

Between the user terminals 20 and the radio base station 11, communication can be carried out using a carrier of a relatively low frequency band (for example, 2 GHz) and a narrow bandwidth (referred to as an "existing carrier," a "legacy carrier" and so on). Meanwhile, between the user terminals 20 and the radio base stations 12, a carrier of a relatively high frequency band (for example, 3.5 GHz, 5 GHz, 30 to 70 GHz and so on) and a wide bandwidth may be used, or the same carrier as that used in the radio base station 11 may be used. Note that the structure of the frequency band for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between 2 radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "gNB (gNodeB)," a "transmitting/receiving point (TRP)" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "eNBs," "gNBs," "transmitting/receiving points (TRPs)" and so on. Hereinafter the radio base stations 11 and 12 will be collectively referred to as "radio base stations 10," unless specified otherwise.

The user terminals 20 are terminals to support various communication schemes such as LTE, LTE-A, 5G, NR and so on, and may be either mobile communication terminals or stationary communication terminals. Furthermore, the user terminals 20 can perform inter-terminal (D2D) communication with other user terminals 20.

In the radio communication system 1, as radio access schemes, OFDMA (orthogonal Frequency Division Multiple Access) can be applied to the downlink (DL), and SC-FDMA (Single-Carrier Frequency Division Multiple Access) can be applied to the uplink (UL). OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are not limited to the combinations of these, and OFDMA may be used in UL.

Also, in the radio communication system 1, a multicarrier waveform (for example, the OFDM waveform) may be used, or a single-carrier waveform (for example, the DFT-s-OFDM waveform) may be used.

In the radio communication system 1, a DL shared channel (PDSCH (Physical Downlink Shared CHannel), which is also referred to as, for example, a "DL data channel"), which is used by each user terminal 20 on a shared basis, a broadcast channel (PBCH (Physical Broadcast CHannel)), L1/L2 control channels and so on, are used as DL channels. User data, higher layer control information and SIBs (System Information Blocks) are communicated in the PDSCH. Also, the MIB (Master Information Block) is communicated in the PBCH.

The L1/L2 control channels include DL control channels (a PDCCH (Physical Downlink Control CHannel), an EPDCCH (Enhanced Physical Downlink Control CHannel) and so on), a PCFICH (Physical Control Format Indicator CHannel), a PHICH (Physical Hybrid-ARQ Indicator CHannel) and so on. Downlink control information (DCI), including PDSCH and PUSCH scheduling information, is communicated by the PDCCH. The number of OFDM symbols to use for the PDCCH is communicated by the PCFICH. The EPDCCH is frequency-division-multiplexed with the PDSCH and used to communicate DCI and so on, like the PDCCH. It is possible to communicate HARQ retransmission control information (ACK/NACK) in response to the PUSCH using at least one of the PHICH, the PDCCH and the EPDCCH.

In the radio communication system 1, a UL shared channel (PUSCH: Physical Uplink Shared CHannel, which is also referred to as "UL data channel" and so on), which is used by each user terminal 20 on a shared basis, a UL control channel (PUCCH: Physical Uplink Control CHannel), a random access channel (PRACH: Physical Random Access CHannel) and so on are used as UL channels. User data, higher layer control information and so on are communicated by the PUSCH. Uplink control information (UCI), including at least one of DL signal retransmission control information (A/N), channel state information (CSI) and so on, is communicated in the PUSCH or the PUCCH. By means of the PRACH, random access preambles for establishing connections with cells are communicated.

<Radio Base Station>

Figure 18:
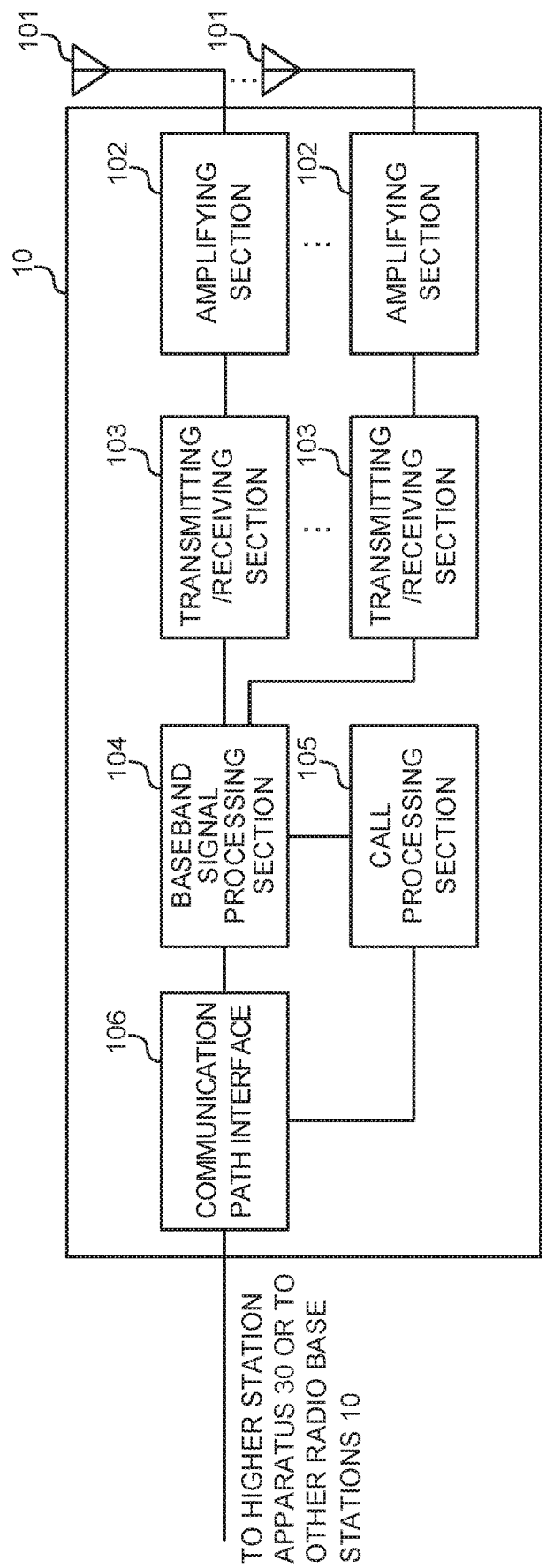
FIG. 18 is a diagram to show an example of an overall structure of a radio base station according to the present embodiment.

FIG. 18 is a diagram to show an example of an overall structure of a radio base station according to the present embodiment. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on DL is input from the higher station apparatus 30 to the baseband signal processing section 104, via the communication path interface 106.

In the baseband signal processing section 104, the user data is subjected to transmission processes, including a PDCP (Packet Data Convergence Protocol) layer process, division and coupling of the user data, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving sections 103. Furthermore, downlink control signals are also subjected to transmission processes such as channel coding and an inverse fast Fourier transform, and forwarded to the transmitting/receiving sections 103.

Baseband signals that are pre-coded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101.

The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for UL signals, radio frequency signals that are received in the transmitting/receiving antennas 101 are each amplified in the amplifying sections 102. The transmitting/receiving sections 103 receive the UL signals amplified in the amplifying sections 102. The received signals are converted into the baseband signal through frequency conversion in the transmitting/receiving sections 103 and output to the baseband signal processing section 104.

In the baseband signal processing section 104, UL data that is included in the UL signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing such as setting up and releasing communication channels, manages the state of the radio base station 10 and manages the radio resources.

The communication path interface section 106 transmits and receives signals to and from the higher station apparatus 30 via a predetermined interface. Also, the communication path interface 106 may transmit and/or receive signals (backhaul signaling) with neighboring radio base stations 10 via an inter-base station interface (for example, an interface in compliance with the CPRI (Common Public Radio Interface), such as optical fiber, the X2 interface, etc.).

In addition, the transmitting/receiving sections 103 transmit DL signals (including at least one of a DL data signal, a DL control signal and a DL reference signal) to the user terminal 20, and receive UL signals (including at least one of a UL data signal, a UL control signal and a UL reference signal) from the user terminal 20.

Furthermore, the transmitting/receiving sections 103 receive UCI from the user terminal 20 via a UL data channel (for example, the PUSCH) or a UL control channel (for example, a short PUCCH and/or a long PUCCH). The UCI may include at least one of HARQ-ACK in response to a DL data channel (for example, the PDSCH), CSI, SR, beam identifying information (for example, beam index (BI)) and a buffer status report (BSR).

In addition, the transmitting/receiving sections 103 may transmit at least one of the above-mentioned RS density information (first aspect), the above-mentioned RS position information (first aspect), the above-mentioned long PUCCH format information (second aspect), the above-mentioned duration information (fourth aspect), the above-mentioned subcarrier duration information (fourth aspect) through physical layer signaling and/or higher layer signaling (L1 signaling). Also, the transmitting/receiving sections 103 may transmit other pieces of control information related to UL control channels (for example, a short PUCCH, a long PUCCH, etc.) (for example, at least one of the format, the presence/absence of sounding reference signals (SRSs), resources for UL control channels, etc.).

Figure 19:
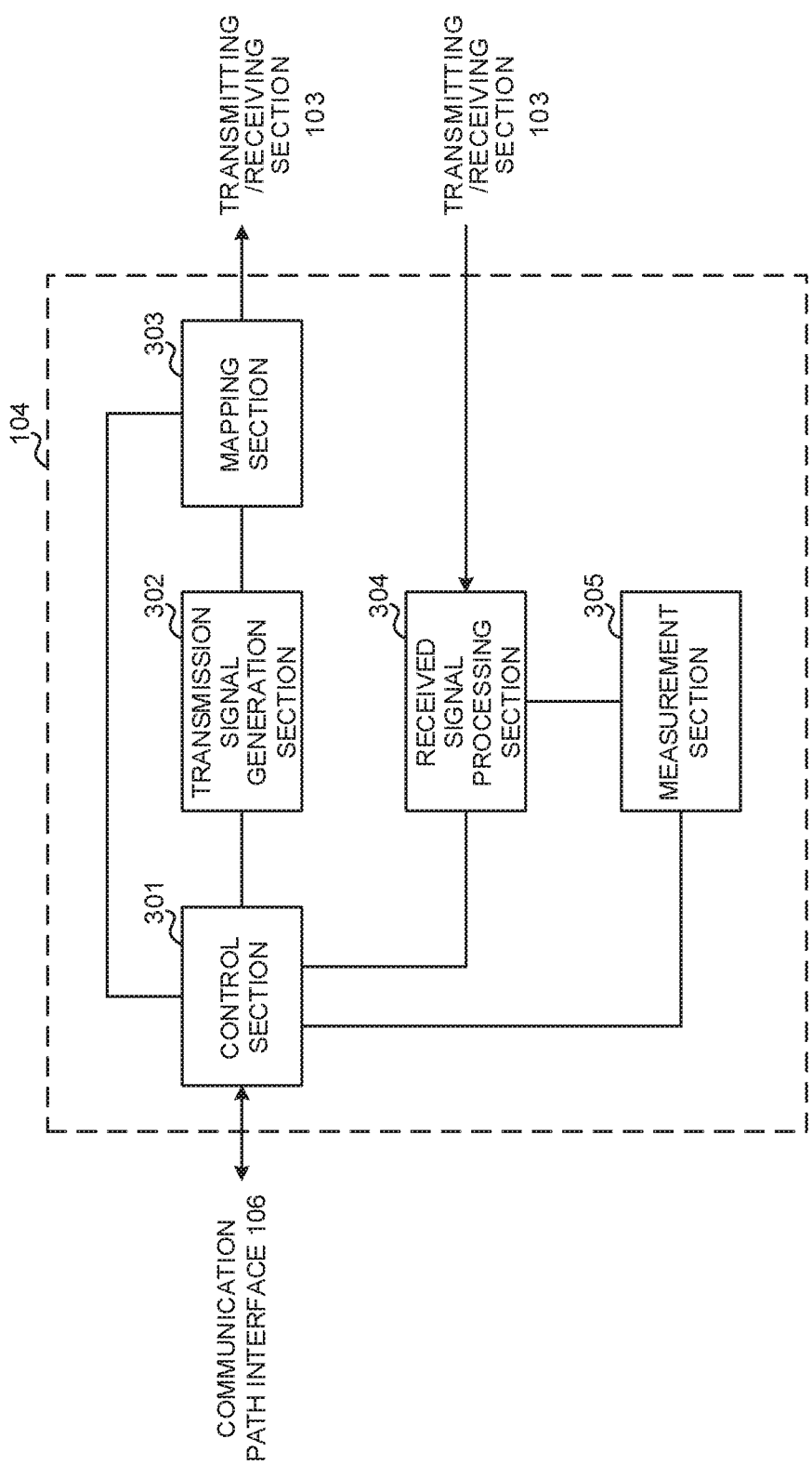
FIG. 19 is a diagram to show an example of a functional structure of a radio base station according to the present embodiment.

FIG. 19 is a diagram to show an example of a functional structure of a radio base station according to the present embodiment. Note that, although FIG. 19 primarily shows functional blocks that pertain to characteristic parts of the present embodiment, the radio base station 10 has other functional blocks that are necessary for radio communication as well. As shown in FIG. 19, the baseband signal processing section 104 has a control section 301, a transmission signal generation section 302, a mapping section 303, a received signal processing section 304 and a measurement section 305.

The control section 301 controls the whole of the radio base station 10. The control section 301 controls, for example, the generation of DL signals by the transmission signal generation section 302, the mapping of DL signals by the mapping section 303, the receiving processes (for example, demodulation) for UL signals by the received signal processing section 304 and the measurements by the measurement section 305.

To be more specific, the control section 301 schedules user terminals 20. To be more specific, the control section 301 may perform the scheduling and/or retransmission control of DL data channels and/or UL data channels based on UCI (for example, CSI and/or BI) from user terminals 20.

Also, the control section 301 may control the format (at least one of, for example, the duration, the number of symbols, the RS density, the RS position, the subcarrier spacing, the number of PUCCH units in a long PUCCH and the structure of each PUCCH unit in the long PUCCH) of UL control channels (for example, a long PUCCH and/or a short PUCCH). For example, the control section 301 may exert control so that at least one of the above-mentioned RS density information (first aspect), the above-mentioned RS position information (first aspect), the above-mentioned long PUCCH format information (second aspect), the above-mentioned duration information (fourth aspect) and the above-mentioned subcarrier spacing information (fourth aspect) is generated and transmitted to the user terminals 20.

In addition, the control section 301 may control the received signal processing section 304 to combine the same UCI received in at least two of multiple PUCCH units constituting a long PUCCH, or restore different UCIs received in at least two of these multiple PUCCH units (second aspect).

The control section 301 may control the received signal processing section 304 so as to perform the receiving process of UCI from the user terminals 20 based on the format of UL control channels (for example, a long PUCCH and/or a short PUCCH).

The control section 301 can be constituted by a controller, a control circuit or control apparatus that can be described based on general understanding of the technical field to which the present invention pertains.

The transmission signal generation section 302 generates DL signals (including DL data signals, DL control signals, DL reference signals and so on) based on commands from the control section 301, and outputs these signals to the mapping section 303.

For the transmission signal generation section 302, a signal generator, a signal generation circuit or signal generation apparatus that can be described based on general understanding of the technical field to which the present invention pertains can be used.

The mapping section 303 maps the DL signals generated in the transmission signal generation section 302 to predetermined radio resources based on commands from the control section 301, and outputs these to the transmitting/receiving sections 103. For the mapping section 303, mapper, a mapping circuit or mapping apparatus that can be described based on general understanding of the technical field to which the present invention pertains can be used.

The received signal processing section 304 performs receiving processes (for example, demapping, demodulation, decoding, etc.) of UL signals transmitted from the user terminals 20 (including, for example, a UL data signal, a UL control signal, a UL reference signal, etc.). To be more specific, the received signal processing section 304 may outputs the received signals, the signals after the receiving processes and so on, to the measurement section 305. In addition, the received signal processing section 304 performs UCI receiving processes based on the UL control channel format commanded from the control section 301.

The measurement section 305 conducts measurements with respect to the received signals. The measurement section 305 can be constituted by a measurer, a measurement circuit or measurement apparatus that can be described based on general understanding of the technical field to which the present invention pertains.

Also, the measurement section 305 may measure the channel quality in UL based on, for example, the received power (for example, RSRP (Reference Signal Received Power)) and/or the received quality (for example, RSRQ (Reference Signal Received Quality)) of UL reference signals. The measurement results may be output to the control section 301.

<User Terminal>

Figure 20:
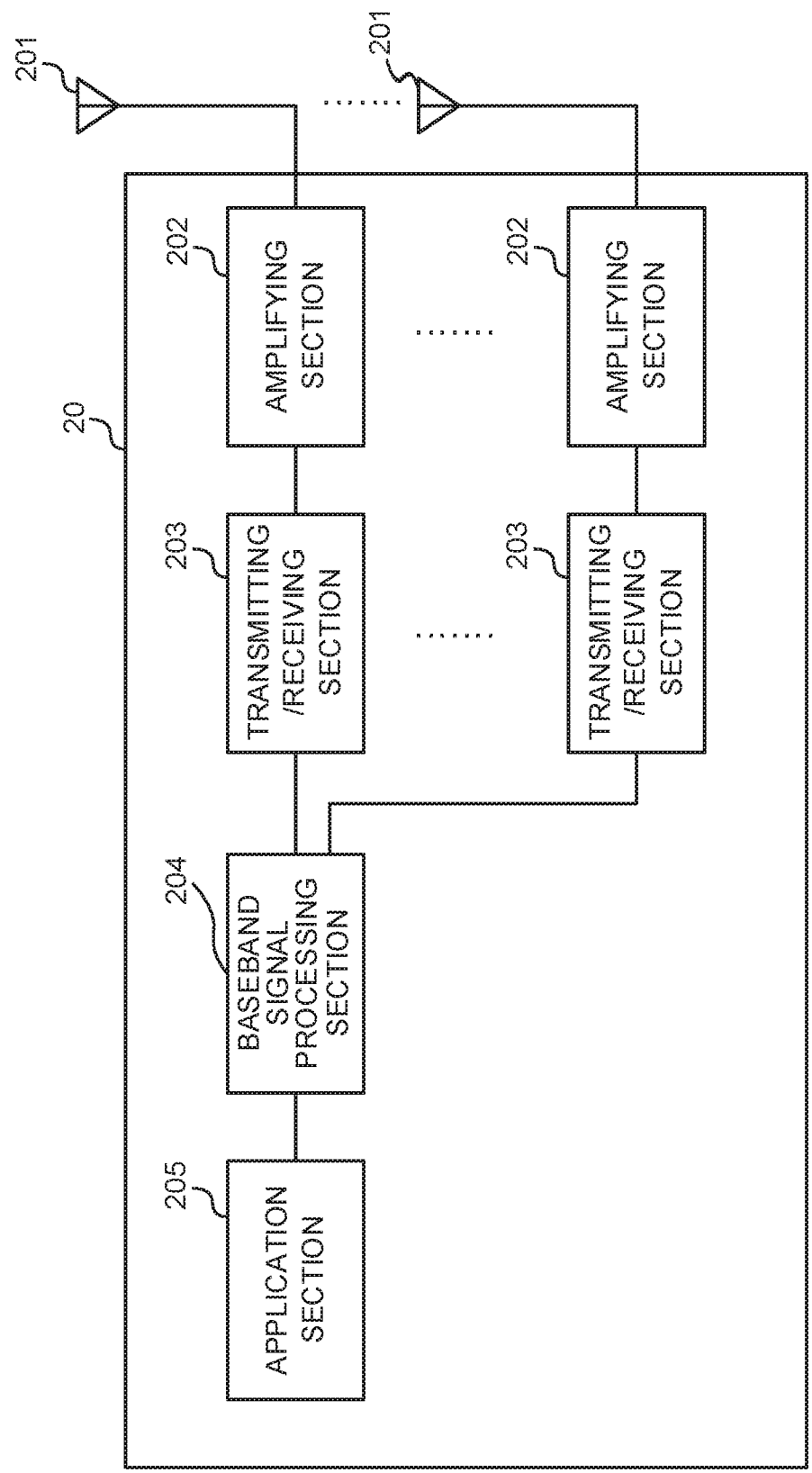
FIG. 20 is a diagram to show an example of an overall structure of a user terminal according to the present embodiment.

FIG. 20 is a diagram to show an example of an overall structure of a user terminal according to the present embodiment. A user terminal 20 has a plurality of transmitting/receiving antennas 201 for MIMO communication, amplifying sections 202, transmitting/receiving sections 203, a baseband signal processing section 204 and an application section 205.

Radio frequency signals that are received in a plurality of transmitting/receiving antennas 201 are each amplified in the amplifying sections 202. Each transmitting/receiving section 203 receives the DL signals amplified in the amplifying sections 202. The received signals are subjected to frequency conversion and converted into the baseband signal in the transmitting/receiving sections 203, and output to the baseband signal processing section 204.

In the baseband signal processing section 204, the baseband signal that is input is subjected to an FFT process, error correction decoding, a retransmission control receiving process, and so on. The DL data is forwarded to the application section 205. The application section 205 performs processes related to higher layers above the physical layer and the MAC layer, and so on. Also, the broadcast information is also forwarded to application section 205.

Meanwhile, the UL data is input from the application section 205 to the baseband signal processing section 204. The baseband signal processing section 204 performs a retransmission control transmission process (for example, an HARQ transmission process), channel coding, rate matching, puncturing, a discrete Fourier transform (DFT) process, an IFFT process and so on, and the result is forwarded to each transmitting/receiving section 203. The UCI is also subjected to at least one of channel coding, rate matching, puncturing, a DFT process and an IFFT process, and the result is forwarded to each transmitting/receiving section 203.

The baseband signal that is output from the baseband signal processing section 204 is converted into a radio frequency band in the transmitting/receiving sections 203. The radio frequency signals that are subjected to frequency conversion in the transmitting/receiving sections 203 are amplified in the amplifying sections 202, and transmitted from the transmitting/receiving antennas 201.

Furthermore, the transmitting/receiving sections 203 receive the DL signals (including DL data signals, DL control signals, DL reference signals, etc.) of the numerology configured in the user terminal 20, and transmits the UL signals (including UL data signals, UL control signals, UL reference signals, etc.) of the numerology.

In addition, the transmitting/receiving sections 203 transmit the UCI to the radio base station 10 using a UL data channel (for example, PUSCH) or a UL control channel (for example, a short PUCCH and/or a long PUCCH).

In addition, the transmitting/receiving sections 203 may receive at least one of the above-mentioned RS density information (first aspect), the above-mentioned RS position information (first aspect), the above-mentioned long PUCCH format information (second aspect), the above-mentioned duration information (fourth aspect), and the above-mentioned subcarrier spacing information (fourth aspect), via physical layer signaling (L1 signaling) and/or higher layer signaling. Also, the transmitting/receiving sections 203 may receive other pieces of control information related to UL control channels (for example, a short PUCCH, a long PUCCH, etc.) (for example, at least one of the format, the presence/absence of sounding reference signals (SRSs), resources for UL control channels, etc.).

For the transmitting/receiving sections 203, transmitters/receivers, transmitting/receiving circuits or transmitting/receiving apparatus that can be described based on general understanding of the technical field to which the present invention pertains can be used. Furthermore, a transmitting/receiving section 203 may be structured as one transmitting/receiving section, or may be formed with a transmitting section and a receiving section.

Figure 21:
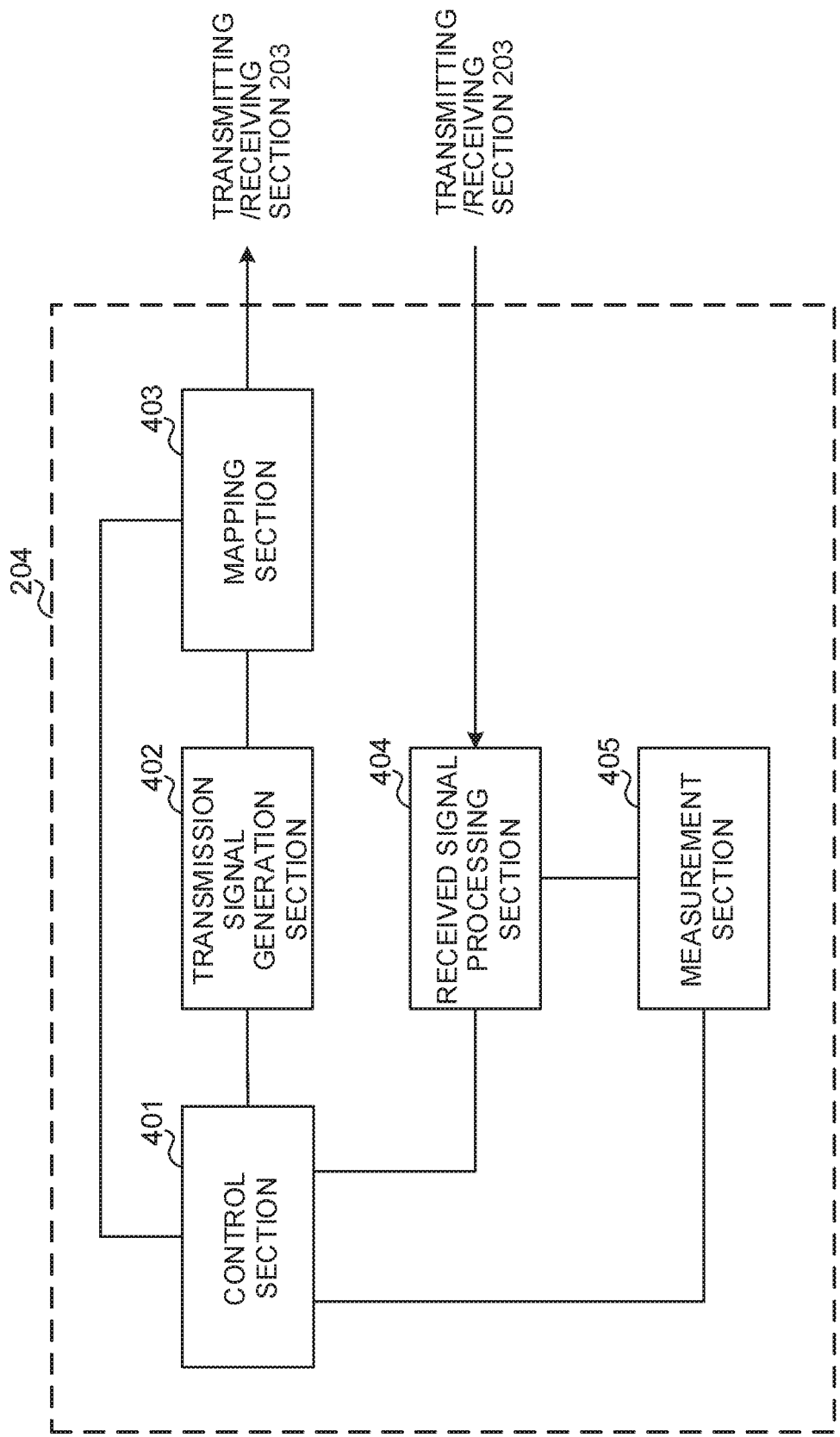
FIG. 21 is a diagram to show an example of a functional structure of a user terminal according to the present embodiment.

FIG. 21 is a diagram to show an example of a functional structure of a user terminal according to the present embodiment. Note that, although FIG. 21 primarily shows functional blocks that pertain to characteristic parts of the present embodiment, the user terminal 20 has other functional blocks that are necessary for radio communication as well. As shown in FIG. 21, the baseband signal processing section 204 provided in the user terminal 20 has a control section 401, a transmission signal generation section 402, a mapping section 403, a received signal processing section 404 and a measurement section 405.

The control section 401 controls the whole of the user terminal 20. The control section 401 controls, for example, the generation of UL signals in the transmission signal generation section 402, the mapping of UL signals in the mapping section 403, the UL signal receiving processes in the received signal processing section 404, the measurements in the measurement section 405 and so on.

Furthermore, the control section 401 controls the UL control channel to be used to transmit UCI from the user terminal 20, based on explicit commands from the radio base station 10 or implicit decisions in the user terminal 20.

Also, the control section 401 may control the format (at least one of, for example, the duration, the number of symbols, the RS density, the RS position, the subcarrier spacing, the number of PUCCH units in a long PUCCH and the structure of each PUCCH unit in the long PUCCH) of UL control channels (for example, a long PUCCH and/or a short PUCCH).

In addition, the control section 401 may control the allocation of frequency resources (bandwidth) to a short PUCCH (see the first aspect and FIG. 7 to FIG. 9). For example, the control section 401 may maintain the bandwidth of a short PUCCH constant before and after the subcarrier spacing in the short PUCCH is changed, or may change the bandwidth of a short PUCCH in accordance with the subcarrier spacing.

In addition, the control section 401 may control a plurality of PUCCH units in a long PUCCH. These multiple PUCCH units may include a plurality of PUCCH units having the same format and/or a plurality of PUCCH units having different formats (see the second aspect, FIG. 10 to FIG. 12).

Also, control section 401 may control the allocation of frequency resources to a plurality of PUCCH units in long PUCCH (see the second aspect, and FIG. 13 and FIG. 14). To be more specific, the control section 401 may control the arrangement of these multiple PUCCH units in the same frequency resource and/or in different frequency resources.

Also, the control section 401 may control at least one of the transmission signal generation section 402, the mapping section 403 and the transmitting/receiving sections 203 to transmit the same UCI or different UCIs in at least two of multiple PUCCH units in a long PUCCH (second aspect). To be more specific, the control section 401 may apply at least one of spreading, repetition and coding so that the same UCI is transmitted in at least two of a plurality of PUCCH units.

Also, the control section 401 may control the arrangement of RSs (and/or the density of RSs) in a short PUCCH (PUCCH unit) and/or a long PUCCH (the first aspect and the second aspect). Here, the RS density in a short PUCCH is 1/2 or less. Therefore, even when this short PUCCH serves as one PUCCH unit, the RS density in a long PUCCH formed with a plurality of PUCCH units is also 1/2 or less.

To be more specific, the control section 401 may control the arrangement of RSs (and/or the density of RSs) that are at least frequency-division-multiplexed with UCI in a short PUCCH or a long PUCCH, based on control information from the radio base station 10 (at least one of, for example, the above-mentioned RS density information and the above-mentioned RS position information). Furthermore, the control section 401 may exert control so that, in symbols in which RSs are arranged, UCI is frequency-division-multiplexed with the RSs (combed out).

Note that the control section 401 may fix the positions for arranging RSs, and control the presence or absence of RSs in these fixed arrangement positions. Alternatively, the control section 401 may control the arrangement of RSs in a flexible manner.

Also, the control section 401 may control interlaced transmission of a short PUCCH and/or a long PUCCH (see the third aspect and FIG. 15).

Also, the control section 401 may determine the format of a short PUCCH and/or a long PUCCH based on the payload of UCI and/or the type of UCI (see the fourth aspect and FIG. 16). For example, the control section 401 may lower the RS density in a short PUCCH and/or a long PUCCH as the payload of UCI increases.

Also, the control section 401 may determine the duration of a short PUCCH and/or a long PUCCH based on duration information from the radio base station 10, the subcarrier spacing in slots (minislots) and/or the subcarrier spacing information from the radio base station 10 (see the fourth aspect and FIG. 16).

The control section 401 may control at least one of the transmission signal generation section 402, the mapping section 403 and the transmitting/receiving sections 203 to perform UCI transmission processes based on the format of the UL control channel.

For the control section 401, a controller, a control circuit or control apparatus that can be described based on general understanding of the technical field to which the present invention pertains can be used.

In the transmission signal generation section 402, UL signals (including UL data signals, UL control signals, UL reference signals, UCI, etc.) are generated (including, for example, encoding, rate matching, puncturing, modulation, etc.) based on commands from the control section 401, and output to the mapping section 403. For the transmission signal generation section 402, a signal generator, a signal generation circuit or signal generation apparatus that can be described based on general understanding of the technical field to which the present invention pertains can be used.

The mapping section 403 maps the UL signals generated in the transmission signal generation section 402 to radio resources based on commands from the control section 401, and output the result to the transmitting/receiving sections 203. For the mapping section 403, a mapper, a mapping circuit or mapping apparatus that can be described based on general understanding of the technical field to which the present invention pertains can be used.

The received signal processing section 404 performs receiving processes (for example, demapping, demodulation, decoding, etc.) of DL signals (including DL data signals, scheduling information, DL control signals, DL reference signals, etc.). The received signal processing section 404 outputs the information received from the radio base station 10, to the control section 401. The received signal processing section 404 outputs, for example, broadcast information, system information, high layer control information related to higher layer signaling such as RRC signaling, physical layer control information (L1/L2 control information) and so on, to the control section 401.

The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The measurement section 405 measures channel states based on reference signals (for example, CSI-RS) from the radio base station 10, and outputs the measurement results to the control section 401. Note that the channel state measurements may be conducted per CC.

The measurement section 405 can be constituted by a signal processor, a signal processing circuit or signal processing apparatus, and a measurer, a measurement circuit or measurement apparatus that can be described based on general understanding of the technical field to which the present invention pertains.

<Hardware Structure>

Note that the block diagrams that have been used to describe the above embodiments show blocks in functional units. These functional blocks (components) may be implemented in arbitrary combinations of hardware and/or software. Also, the means for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire or wireless, for example) and using these multiple pieces of apparatus.

Figure 22:
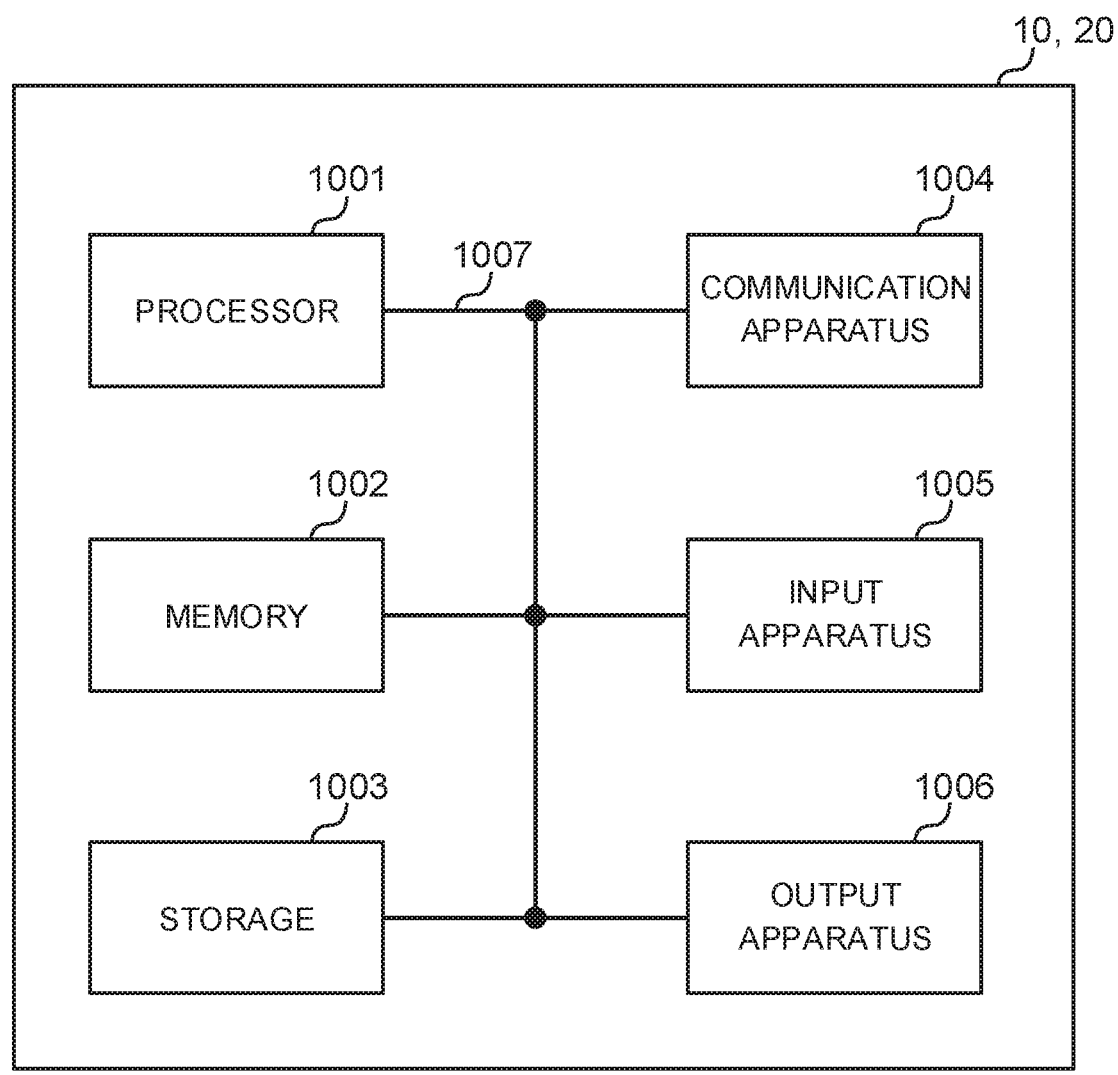
FIG. 22 is a diagram to show an example hardware structure of a radio base station and a user terminal according to the present embodiment.

For example, the radio base station, user terminals and so on according to embodiments of the present invention may function as a computer that executes the processes of the radio communication method of the present invention. FIG. 22 is a diagram to show an example of a hardware structure of a radio base station and a user terminal according to one embodiment of the present invention. Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

For example, although only one processor 1001 is shown, a plurality of processors may be provided. Furthermore, processes may be implemented with one processor, or processes may be implemented in sequence, or in different manners, on two or more processors. Note that the processor 1001 may be implemented with one or more chips.

Each function of the radio base station 10 and the user terminal 20 is implemented by reading predetermined software (program) on hardware such as the processor 1001 and the memory 1002, and by controlling the calculations in the processor 1001, the communication in the communication apparatus 1004, and the reading and/or writing of data in the memory 1002 and the storage 1003.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules or data, from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory" (primary storage apparatus) and so on. The memory 1002 can store executable programs (program codes), software modules and/or the like for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving device) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, these pieces of apparatus, including the processor 1001, the memory 1002 and so on are connected by the bus 1007 so as to communicate information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

(Variations)

Note that the terminology used in this specification and the terminology that is needed to understand this specification may be replaced by other terms that convey the same or similar meanings. For example, "channels" and/or "symbols" may be replaced by "signals (or "signaling")." Also, "signals" may be "messages." A reference signal may be abbreviated as an "RS," and may be referred to as a "pilot," a "pilot signal" and so on, depending on which standard applies. Furthermore, a "component carrier" (CC) may be referred to as a "cell," a "frequency carrier," a "carrier frequency" and so on.

Further, a radio frame may be comprised of one or more periods (frames) in the time domain. Each of one or more periods (frames) constituting a radio frame may be referred to as a "subframe." Further, a subframe may be comprised of one or more slots in the time domain. A subframe may be a fixed time duration (for example, one ms) not dependent on the numerology.

Furthermore, a slot may be comprised of one or more symbols in the time domain (OFDM (Orthogonal Frequency Division Multiplexing) symbols, SC-FDMA (Single Carrier Frequency Division Multiple Access) symbols, and so on). Also, a slot may be a time unit based on numerology. Also, a slot may include a plurality of mini-slots. Each mini-slot may consist of one or more symbols in the time domain. Also, a mini-slot may be referred to as a "subslot."

A radio frame, a subframe, a slot, a mini-slot and a symbol all represent the time unit in signal communication. A radio frame, a subframe, a slot, a mini-slot and a symbol may be each called by other applicable names. For example, one subframe may be referred to as a "transmission time interval (TTI)," or a plurality of consecutive subframes may be referred to as a "TTI," or one slot or mini-slot may be referred to as a "TTI." That is, a subframe and/or a TTI may be a subframe (one ms) in existing LTE, may be a shorter period than one ms (for example, one to thirteen symbols), or may be a longer period of time than one ms. Note that the unit to represent the TTI may be referred to as a "slot," a "mini slot" and so on, instead of a "subframe."

Here, a TTI refers to the minimum time unit of scheduling in radio communication, for example. For example, in LTE systems, a radio base station schedules the radio resources (such as the frequency bandwidth and transmission power that can be used in each user terminal) to allocate to each user terminal in TTI units. Note that the definition of TTIs is not limited to this.

The TTI may be the transmission time unit of channel-encoded data packets (transport blocks), code blocks and/or codewords, or may be the unit of processing in scheduling, link adaptation and so on. Note that when a TTI is given, the period of time (for example, the number of symbols) in which transport blocks, code blocks and/or codewords are actually mapped may be shorter than the TTI.

Note that, when one slot or one mini-slot is referred to as a "TTI," one or more TTIs (that is, one or more slots or one or more mini-slots) may be the minimum time unit of scheduling. Also, the number of slots (the number of mini-slots) to constitute this minimum time unit of scheduling may be controlled.

A TTI having a time duration of one ms may be referred to as a "normal TTI (TTI in LTE Rel. 8 to 12)," a "long TTI," a "normal subframe," a "long subframe," and so on. A TTI that is shorter than a normal TTI may be referred to as a "shortened TTI," a "short TTI," "a partial TTI (or a "fractional TTI"), a "shortened subframe," a "short subframe," a "mini-slot," "a sub-slot" and so on.

Note that a long TTI (for example, a normal TTI, a subframe, etc.) may be replaced with a TTI having a time duration exceeding one ms, and a short TTI (for example, a shortened TTI) may be replaced with a TTI having a TTI length less than the TTI length of a long TTI and not less than one ms.

A resource block (RB) is the unit of resource allocation in the time domain and the frequency domain, and may include one or a plurality of consecutive subcarriers in the frequency domain. Also, an RB may include one or more symbols in the time domain, and may be one slot, one mini-slot, one subframe or one TTI in length. One TTI and one subframe each may be comprised of one or more resource blocks. Note that one or more RBs may be referred to as a "physical resource block (PRB: Physical RB)," a "subcarrier group (SCG: Sub-Carrier Group)," a "resource element group (REG)," an "PRB pair," an "RB pair" and so on.

Furthermore, a resource block may be comprised of one or more resource elements (REs). For example, one RE may be a radio resource field of one subcarrier and one symbol.

Note that the structures of radio frames, subframes, slots, mini-slots, symbols and so on described above are merely examples. For example, configurations pertaining to the number of subframes included in a radio frame, the number of slots included in a subframe, the number of mini-slots included in a slot, the number of symbols and RBs included in a slot or a mini-slot, the number of subcarriers included in an RB, the number of symbols in a TTI, the symbol duration, the length of cyclic prefixes (CPs) and so on can be variously changed.

Also, the information and parameters described in this specification may be represented in absolute values or in relative values with respect to predetermined values, or may be represented in other information formats. For example, radio resources may be specified by predetermined indices. In addition, equations to use these parameters and so on may be used, apart from those explicitly disclosed in this specification.

The names used for parameters and so on in this specification are in no respect limiting. For example, since various channels (PUCCH (Physical Uplink Control Channel), PDCCH (Physical Downlink Control Channel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and output via a plurality of network nodes.

The information, signals and so on that are input may be transmitted to other pieces of apparatus. The information, signals and so on to be input and/or output can be overwritten, updated or appended. The information, signals and so on that are output may be deleted. The information, signals and so on that are input may be transmitted to other pieces of apparatus.

Reporting of information is by no means limited to the aspects/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)" and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of predetermined information (for example, reporting of information to the effect that "X holds") does not necessarily have to be sent explicitly, and can be sent implicitly (by, for example, not reporting this piece of information).

Decisions may be made in values represented by one bit (0 or 1), may be made in Boolean values that represent true or false, or may be made by comparing numerical values (for example, comparison against a predetermined value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs: Remote Radio Heads)). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Further, the radio base stations in this specification may be interpreted as user terminals. For example, each aspect/embodiment of the present invention may be applied to a configuration in which communication between a radio base station and a user terminal is replaced with communication among a plurality of user terminals (D2D: Device-to-Device). In this case, user terminals 20 may have the functions of the radio base stations 10 described above. In addition, terms such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Certain actions which have been described in this specification to be performed by base station may, in some cases, be performed by upper nodes. In a network comprised of one or more network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The aspects/embodiments illustrated in this specification may be used individually or in combinations, which may be switched depending on the mode of implementation. The order of processes, sequences, flowcharts and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate systems and/or next-generation systems that are enhanced based on these.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used only for convenience, as a method for distinguishing between two or more elements. Thus, reference to the first and second elements does not imply that only two elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure, ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between two elements that are "connected" or "coupled" to each other. The coupling or connection between the elements may be physical, logical or a combination thereof. For example, "connection" may be interpreted as "access." As used herein, two elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in the radio frequency, microwave and optical regions (both visible and invisible).

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The disclosure of Japanese Patent Application No. 2017-008947, filed on Jan. 20, 2017, including the specification, drawings and abstract, is incorporated herein by reference in its entirety.

The invention claimed is:

1. A terminal comprising:
   a transmitting section that transmits uplink control information (UCI) using a physical uplink control channel (PUCCH) for a first duration, of which a number of symbols is 1 or 2, and a PUCCH for a second duration, of which a number of symbols is 4 or more and 14 or less, that are time-division multiplexed in a same slot; and
   a control section that controls so that a number of demodulation reference signals (DMRSs) corresponding to the PUCCH for the first duration and a number of DMRSs corresponding to the PUCCH for the second duration are different in frequency direction, wherein a PUCCH format of the PUCCH for the first duration is different from a PUCCH format of the PUCCH for the second duration.

2. The terminal according to claim 1, wherein the control section determines a configuration of the PUCCH based on a number of bits of the UCI.

3. The terminal according to claim 1, wherein a number of bits of the UCI transmitted using the first PUCCH is different form a number of bits of the UCI transmitted using the second PUCCH.

4. A radio communication method for a terminal comprising:

transmitting uplink control information (UCI) using a physical uplink control channel (PUCCH) for a first duration, of which a number of symbols is 1 or 2, and a PUCCH for a second duration, of which a number of symbols is 4 or more and 14 or less, that are time-division multiplexed in a same slot;

controlling so that a number of demodulation reference signals (DMRS s) corresponding to the PUCCH for the first duration and a number of DMRSs corresponding to the PUCCH for the second duration are different in frequency direction, wherein a PUCCH format of the PUCCH for the first duration is different from a PUCCH format of the PUCCH for the second duration.

5. A system comprising a terminal and a base station, wherein the terminal comprises:

a transmitting section that transmits uplink control information (UCI) using a physical uplink control channel (PUCCH) for a first duration, of which a number of symbols is 1 or 2, and a PUCCH for a second duration, of which a number of symbols is 4 or more and 14 or less, that are time-division multiplexed in a same slot; and a control section that controls so that a number of demodulation reference signals (DMRSs) corresponding to the PUCCH for the first duration and a number of DMRSs corresponding to the PUCCH for the second duration are different in frequency direction, wherein a PUCCH format of the PUCCH for the first duration is different from a PUCCH format of the PUCCH for the second duration; and the base station comprises:

a receiving section that receives the UCI.

* * * * *